United States Patent
Kim et al.

(10) Patent No.: US 10,484,347 B2
(45) Date of Patent: Nov. 19, 2019

(54) METHOD AND APPARATUS FOR SUPPORTING SECURE CHAT

(71) Applicant: Samsung Electronics Co., Ltd., Suwon-si, Gyeonggi-do (KR)

(72) Inventors: Bo Seong Kim, Suwon-si (KR); Dong Hoon Kang, Suwon-si (KR); Jin Seok Kang, Suwon-si (KR); Min Kyun Kim, Suwon-si (KR); Su Jeong Yoon, Seoul (KR); Jae Young Lee, Seoul (KR); Nam In Kim, Suwon-si (KR); Beom Jun Lee, Seongnam-si (KR); Sung Mi Lee, Seoul (KR); Hyeong Seok Lee, Hwaseong-si (KR); Ye Seul Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 379 days.

(21) Appl. No.: 15/205,727

(22) Filed: Jul. 8, 2016

(65) Prior Publication Data

US 2017/0012950 A1   Jan. 12, 2017

(30) Foreign Application Priority Data

Jul. 9, 2015   (KR) ........................ 10-2015-0098023

(51) Int. Cl.
| | |
|---|---|
| *H04L 29/06* | (2006.01) |
| *H04L 9/08* | (2006.01) |
| *H04L 12/58* | (2006.01) |
| *H04W 4/12* | (2009.01) |
| *H04W 12/02* | (2009.01) |
| *H04W 12/00* | (2009.01) |

(52) U.S. Cl.
CPC ........ *H04L 63/0442* (2013.01); *H04L 9/0825* (2013.01); *H04L 9/0891* (2013.01); *H04L 51/04* (2013.01); *H04W 4/12* (2013.01); *H04W 12/02* (2013.01); *H04W 12/00518* (2019.01)

(58) Field of Classification Search
CPC . H04L 63/0442; H04L 9/0825; H04L 9/0891; H04L 63/061; H04L 63/10
See application file for complete search history.

(56) References Cited

U.S. PATENT DOCUMENTS

| | | | |
|---|---|---|---|
| 6,442,590 B1* | 8/2002 | Inala ...................... | H04L 29/06 709/203 |
| 7,675,874 B2* | 3/2010 | Jennings, III ....... | H04L 12/1822 370/260 |
| 8,625,805 B1 | 1/2014 | Statica et al. | |
| 8,707,454 B1 | 4/2014 | Statica | |
| 8,788,680 B1* | 7/2014 | Naik ..................... | H04L 67/306 709/227 |
| 8,903,933 B1* | 12/2014 | Bellini, III ........ | H04L 29/08837 707/705 |

(Continued)

*Primary Examiner* — Sharon S Lynch
(74) *Attorney, Agent, or Firm* — Jefferson IP Law, LLP

(57) ABSTRACT

An electronic device is provided. The electronic device includes a processor, and a memory configured to store a messenger application, wherein the processor is configured to output the messenger application on the display and output a list of chat rooms joined based on a first user account on the display, and wherein the list of the plurality of chat rooms comprises a first chat room, in which the electronic device participates, and a second chat room in which another electronic device participates.

5 Claims, 18 Drawing Sheets

(56) References Cited

U.S. PATENT DOCUMENTS

| | | | |
|---|---|---|---|
| 8,954,726 B1 | 2/2015 | Statica et al. | |
| 8,958,559 B2 | 2/2015 | Medina et al. | |
| 8,996,642 B1* | 3/2015 | Bellini, III | H04L 29/08837 707/705 |
| 9,083,529 B1 | 7/2015 | Statica | |
| 9,197,587 B2* | 11/2015 | Bansal | H04L 51/12 |
| 9,285,981 B1 | 3/2016 | Leavy et al. | |
| 9,912,676 B1* | 3/2018 | Fieldman | H04L 63/08 |
| 2003/0018716 A1* | 1/2003 | Webb | G06Q 30/02 709/205 |
| 2006/0209727 A1* | 9/2006 | Jennings, III | H04L 12/1822 370/260 |
| 2006/0242232 A1* | 10/2006 | Murillo | H04L 12/1813 709/204 |
| 2007/0112918 A1* | 5/2007 | Berstis | G06Q 10/107 709/206 |
| 2008/0034040 A1* | 2/2008 | Wherry | G06Q 10/107 709/204 |
| 2008/0059986 A1* | 3/2008 | Kalinowski | H04N 5/44543 725/1 |
| 2008/0172471 A1* | 7/2008 | Berstis | G06Q 10/107 709/206 |
| 2008/0276315 A1* | 11/2008 | Shuster | H04L 63/1408 726/22 |
| 2009/0204673 A1* | 8/2009 | Tian | H04L 12/1822 709/204 |
| 2009/0210494 A1* | 8/2009 | Fisher | G06Q 10/10 709/205 |
| 2010/0088414 A1* | 4/2010 | Lin | H04L 12/1818 709/227 |
| 2011/0314106 A1* | 12/2011 | Bansal | H04L 51/12 709/206 |
| 2012/0110099 A1* | 5/2012 | Fujihara | H04L 12/1818 709/206 |
| 2012/0182384 A1* | 7/2012 | Anderson | H04L 12/1827 348/14.09 |
| 2012/0297321 A1* | 11/2012 | Douglas | H04L 51/043 715/758 |
| 2012/0311329 A1 | 12/2012 | Medina et al. | |
| 2013/0047099 A1* | 2/2013 | Markman | G06F 17/274 715/758 |
| 2013/0152221 A1* | 6/2013 | Yin | G06F 21/10 726/31 |
| 2014/0236953 A1* | 8/2014 | Rapaport | G06Q 10/10 707/740 |
| 2015/0074212 A1* | 3/2015 | Bansal | H04L 51/12 709/206 |
| 2016/0006761 A1* | 1/2016 | Shuster | H04L 63/1408 726/23 |
| 2016/0036749 A1* | 2/2016 | Bansal | H04L 51/12 709/206 |
| 2016/0072785 A1 | 3/2016 | Statica et al. | |
| 2016/0134428 A1* | 5/2016 | Ouyang | H04L 12/1822 709/204 |

* cited by examiner

METHOD AND APPARATUS FOR SUPPORTING SECURE CHAT

CROSS-REFERENCE TO RELATED APPLICATION(S)

This application claims the benefit under 35 U.S.C. § 119(a) of a Korean patent application filed on Jul. 9, 2015 in the Korean Intellectual Property Office and assigned Serial number 10-2015-0098023, the entire disclosure of which is hereby incorporated by reference.

TECHNICAL FIELD

The present disclosure relates to a technique that provides a messenger service by using a plurality of user terminals interworking with the same user account.

BACKGROUND

A user terminal such as a personal computer (PC) or a smartphone supports a chat service between users through a messenger program. With the development of a messenger service, a security technology that encrypts chat contents has been also developed such that the third party except chat counterparts does not confirm the chat contents. For example, a technology that encrypts the chat contents by using a symmetric key or an asymmetric key may be used. Moreover, an end-to-end encryption technology that performs encryption/decryption at a terminal is used such that the chat contents are not disclosed when a message is sent from the terminal to another terminal.

A user utilizes a plurality of terminals with one user account, and thus the possibility that chat contents are disclosed increases. For example, even though a user chats by using a messenger application of a smartphone, the chat contents are displayed on a PC or tablet (which is placed at a location different from that of a user) in which the same messenger application is installed.

As such, in the case where a user utilizes a plurality of terminals, a current manner in which the chat contents are synchronized with and provided to the plurality of terminals is vulnerable to the security.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device which includes a processor, a memory in which a messenger application is stored, and a display on which an execution screen of the messenger application is outputted. The processor is configured to display a list of a plurality of chat rooms joined with a first user account on the display. The list of the plurality of chat rooms includes a first chat room, in which the electronic device participates, and a second chat room in which another electronic device participates.

In accordance with another aspect of the present disclosure, an electronic device is provided. The electronic device includes a communication module, a processor, and a memory in which a messenger application associated with account information of a first user is stored. The processor is configured to request a server to create a chat room including the first user and a second user, to encrypt a session key of the chat room by using public keys of a plurality of second user terminals respectively corresponding to account information of the second user, and to allow the communication module to send the session keys encrypted by using the public keys of the plurality of second user terminals to the plurality of second user terminals.

In accordance with another aspect of the present disclosure, a messenger service method is provided. The method includes receiving a creation request of a chat room including a first user and a second user from a first user device, sending an invitation request of the chat room to a plurality of second user devices corresponding to the second user, receiving an invitation acceptance message indicating acceptance of the invitation request from at least one device of the plurality of second user devices, and sending a chat message to the at least one device such that the chat message received from the first user device is displayed through only the at least one device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
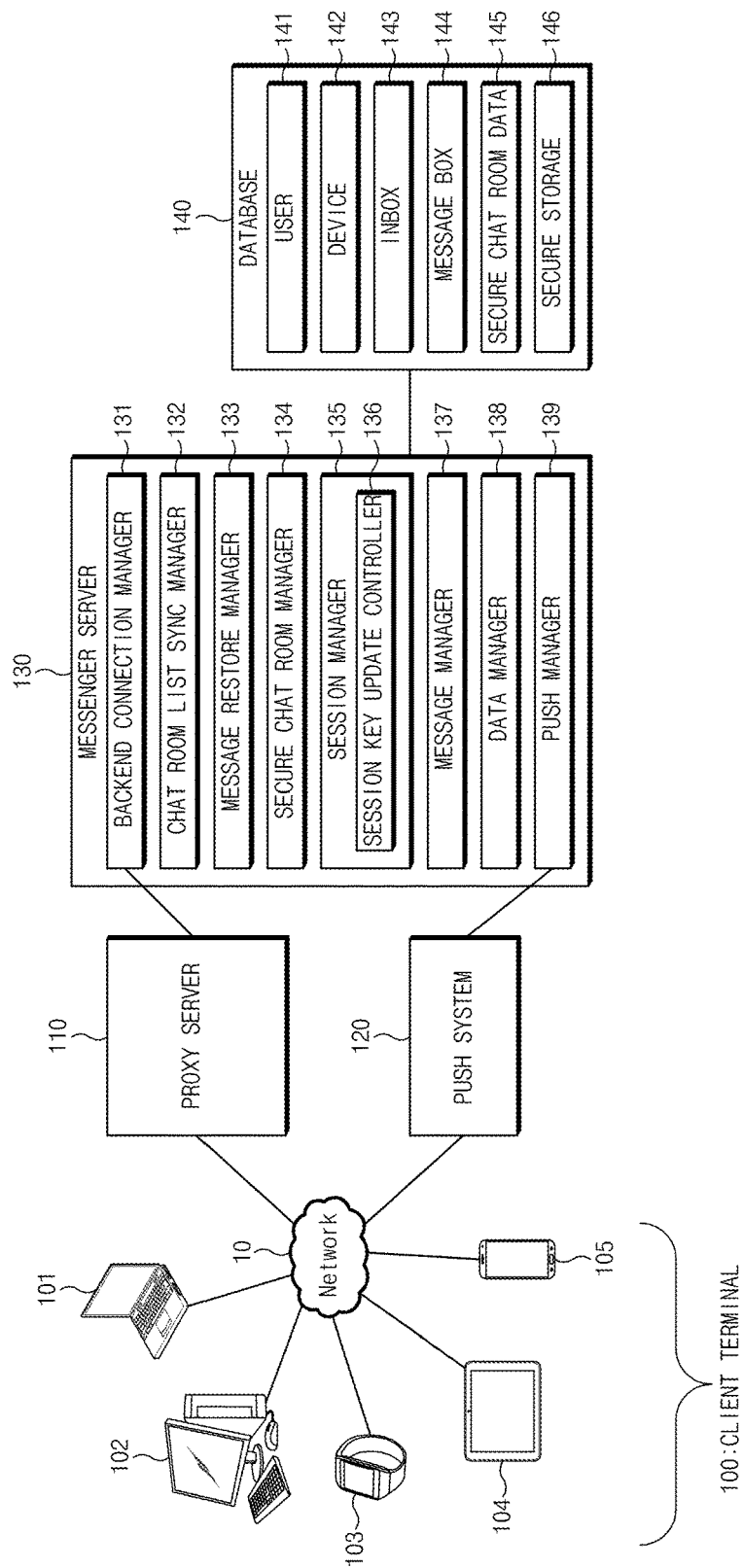
FIG. 1 illustrates a network environment for providing a messenger service according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. The terms of a singular form may include plural forms unless they have a clearly different meaning in the context. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding embodiments of the present disclosure.

An electronic device according to various embodiments of the present disclosure may include at least one of a smartphone, a tablet personal computer (PC), a mobile phone, a video telephone, an electronic book reader, a desktop PC, a laptop PC, a netbook computer, a workstation, a server, a personal digital assistant (PDA), a portable multimedia player (PMP), a motion picture experts group (MPEG-1 or MPEG-2) audio layer 3 (MP3) player, a mobile medical device, a camera, or a wearable device. The wearable device may include at least one of an accessory-type device (e.g., a watch, a ring, a bracelet, an anklet, a necklace, glasses, a contact lens, a head-mounted device (HMD)), a textile- or clothing-integrated-type device (e.g., an electronic apparel), a body-attached-type device (e.g., a skin pad or a tattoo), or a bio-implantable-type device (e.g., an implantable circuit)

In some various embodiments of the present disclosure, an electronic device may be a home appliance. The smart home appliance may include at least one of, for example, a television (TV), a digital video/versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame In other various embodiments of the present disclosure, an electronic device may include at least one of various medical devices (e.g., various portable medical measurement devices (e.g., a blood glucose measuring device, a heart rate measuring device, a blood pressure measuring device, a body temperature measuring device, or the like), a magnetic resonance angiography (MRA), a magnetic resonance imaging (MRI), a computed tomography (CT), a scanner, an ultrasonic device, or the like), a navigation device, a global navigation satellite system (GNSS), an event data recorder (EDR), a flight data recorder (FDR), a vehicle infotainment device, electronic equipment for vessels (e.g., a navigation system, a gyrocompass, or the like), avionics, a security device, a head unit for a vehicle, an industrial or home robot, an automatic teller machine (ATM), a point of sales (POS) device of a store, or an internet of things (IoT) device (e.g., a light bulb, various sensors, an electric or gas meter, a sprinkler, a fire alarm, a thermostat, a streetlamp, a toaster, exercise equipment, a hot water tank, a heater, a boiler, or the like).

According to various embodiments of the present disclosure, an electronic device may include at least one of a part of furniture or a building/structure, an electronic board, an electronic signature receiving device, a projector, or a measuring instrument (e.g., a water meter, an electricity meter, a gas meter, a wave meter, or the like). An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 illustrates a network environment for providing a messenger service according to an embodiment of the present disclosure.

Referring to FIG. 1, the network environment for providing the messenger service according to an embodiment may include a first client device that creates a chat room, a second client device that is invited to the chat room, and a server that relays the first client device and the second client device. The first client device may correspond to a client terminal 100, and the server may correspond to at least one of a proxy server (PS) 110, a push system 120, and a messenger server 130. According to an embodiment, the PS 110 and the push system 120 may constitute a part of the messenger server 130 and may be implemented with independent servers, respectively. According to an embodiment, the client terminal 100 may be connected with the messenger server 130 over the network 10. It is understood that the second client device is an element that is the same as the first client device or corresponds to the first client device. Accordingly, the second client device is omitted in FIG. 1.

According to an embodiment, N-screen devices may be a device of which at least some of functions are shared through one user account or in which a portion of data is synchronized through one user account. For example, the client terminal 100 may correspond to at least one of a laptop 101, a desktop 102, a wearable device 103, a tablet 104, and a smartphone 105 that corresponds to one user account (or to which a user logs in with one user account). For example, in the case where the same messenger application is installed in the tablet 104 and the smartphone 105 and the first user account is logged in to each messenger application, both the tablet 104 and the smartphone 105 may output the chat room invitation or chat message if a chat room invitation or chat message is received from a second user. Hereinafter, systems/elements constituting the network environment will be described.

According to an embodiment, the client terminal 100 may correspond to a device that executes a messenger program (or application). The client terminal 100 may correspond to a plurality of N-screen devices. In the present disclosure, a description about the client terminal 100 may correspond to a description about the above-mentioned first client device or second client device. The client terminal 100 may be used simply as an electronic device or user terminal. An example of a hardware configuration of the electronic device is illustrated below with reference to FIG. 2, and an example of software configuration thereof is illustrated below with reference to FIG. 3. Moreover, hardware and software of the electronic device will be described with reference to FIGS. 16 to 18.

The network 10 may include may include a wired or wireless network, which connects a server and a client, such as wireless fidelity (Wi-Fi) or a cellular network. Various embodiments of the wired or wireless network will be described with reference to FIG. 16.

According to an embodiment, the PS 110 may manage a transmission control protocol (TCP) connection with the client terminal 100. For example, to manage the TCP connection, the PS 110 may periodically exchange a keep-alive message with the client terminal 100 or may relay data transmission or reception between the client terminal 100 and the messenger server 130. Moreover, the PS 110 may send an event of establishing/releasing the TCP connection with the client terminal 100 to other servers (e.g., the messenger server 130) connected with the PS 110. According to an embodiment, the messenger server 130 may be directly connected with the client terminal 100 through the network 10 without the PS 110. Moreover, the PS 110 may be included as one element of the messenger server 130. Also, the PS 110 may be composed of a plurality of servers.

According to an embodiment, the push system 120 or a push server may be, for example, a system that provides a push service such as Google cloud messaging (GCM), a Samsung push protocol (SPP), or an Apple push notification service (APNS). The push system 120 may use or provide the plurality of services. Moreover, the push system 120 may be composed of a plurality of servers.

According to an embodiment, the messenger server 130 may execute a function associated with the chat room and message processing. According to an embodiment, the messenger server 130 may create and manage the chat room and may send/receive a message in conjunction with various infra systems (e.g., relation database (RDB), non-structured query language (No-SQL), the push system 120, and the like) placed inside/outside the messenger server 130. For example, the messenger server 130 may execute a chat room lifecycle managing function and a chat room participation member managing function (e.g., creating of the chat room, deleting of the chat room, inviting of the chat room, entering of the chat room, exiting from the chat room, or compulsory exiting from the chat room, delegating of authority of a host, replacing of the host, or the like). Moreover, the messenger server 130 may execute a function (e.g., a function to forward a message in real time, a function to store a message, a function to restore a message, and a function to forward a message) to forward a message to the chat room members. Also, the messenger server 130 may receive various events associated with a user account and a user terminal of each of the chat room members and may process the received events (e.g., withdraw from account, change a terminal attribute, register a terminal, terminate terminal registration, or the like). Hereinafter, various elements of the messenger server 130 will be described. According to an embodiment, the messenger server 130 may be implemented with an independent server.

According to an embodiment, a backend connection manager 131 may manage a connection between the messenger server 130 and the PS 110. According to an embodiment, when the client terminal 100 requests chat room synchronization from a chat room list sync manager 132, the chat room list sync manager 132 may synchronize the chat room list stored in the messenger server 130 with the client terminal 100. According to an embodiment, in the case where the client terminal 100 requests a message restore manager 133 to restore a message, the message restore manager 133 may restore the message exchanged in the chat room.

According to an embodiment, a secure chat room manager 134 may manage a specific client terminal, which participates in the chat room, from among a plurality of client terminals managed with the same user account. For example, in the case where the first user invites a second user to the secure chat room to create the secure chat room, the number of terminals corresponding to an account of the second user may be three (e.g., a smartphone, a tablet, and a notebook computer), for example, a terminal A, a terminal B, and a terminal C. In the case where the second user participates in the secure chat room by using the terminal A (e.g., the smartphone) among the three terminals A, B, and C, the secure chat room manager 134 may manage the terminal A, which will be detailed described below.

(1) Accept a Secure Chat Room Invitation (Entrance)

According to an embodiment, in the case where the terminal A accepts the participation in (or invitation of) the secure chat room, the secure chat room manager 134 may add the terminal A, which accepts the invitation, to an acceptance table of the secure chat room data. Moreover, if the terminal A accepts the invitation, the secure chat room manager 134 may forward an acceptance control message to other users (e.g., the first user), which currently participate in the secure chat room, and/or another terminal B or C (e.g., the tablet, the notebook computer) of the second user. Whenever receiving a control message associated with the acceptance of another terminal from the message server 130, each client may update an acceptance situation. The information about the acceptance situation may be used when a session key associated with the secure chat room is updated. For example, the first user terminal may update a session key for encrypting chat contents of the chat room, may encrypt the session key of the chat room updated by using a public key corresponding to the terminal A, which accepts the participation in the chat room, from among three terminals of the second user, and may send the encrypted session key to the terminal A of the second user through the messenger server 130. The terminal A may decrypt the encrypted session key by using a private key stored in the terminal A and may decrypt the chat contents by using the obtained session key.

(2) Cancel the Invitation Acceptance of the Secure Chat Room (Exit)

According to an embodiment, if the terminal A, which participates in the secure chat room, or the terminal B or C that does not participate therein cancels the acceptance (e.g., exit the chat room), the secure chat room manager 134 may remove a device (e.g., the terminal A), which cancels the acceptance, from the acceptance table of the secure chat room data. Moreover, if the terminal A cancels the acceptance, the secure chat room manager 134 may forward an acceptance cancellation control message to other users (e.g., the first user), which currently participate in the secure chat room, and/or the terminal B or C (e.g., the tablet, the notebook computer) of the second user. Whenever receiving a control message with respect to the acceptance cancellation of another terminal from the message server 130, each client may update the acceptance table. The information about the acceptance situation may be used upon updating of a session key associated with the secure chat room.

As described above, an embodiment of the acceptance cancellation is described based on the terminal A of the second user. However, according to an embodiment, the acceptance cancellation may be also generated at the terminal of the first user. For example, the first user may log in to a first terminal and a second terminal with the first user account and may currently participate in a secure chat room by using the first terminal. In this case, if the acceptance (chat room exit) of the first terminal is canceled at the first terminal or the second terminal, the acceptance table may be changed, and the acceptance cancellation control message may be sent in a similar manner. If the first user is the creator (or a host) of the chat room, the authority of the creator of the chat room may be transferred to the second user.

According to an embodiment, the acceptance table may be stored in a database 140 (e.g., a database server) that is accessed from the messenger server 130 or is implemented in the messenger server 130. Additionally, the acceptance table may be stored in storage of the client terminal 100. Acceptance tables that are respectively stored in a server and a terminal may be synchronized with each other. Here, in the case where data conflicts with each other, the acceptance table stored in the server may have priority over the acceptance table stored in the terminal.

According to an embodiment, in the case where there is a need to an access the chat room according to a request such as creating of the chat room, inviting of the chat room, exiting from the chat room, entering of the chat room, talking (chatting), or compulsory exiting from the chat room, the session manager 135 may define a session associated with the requested chat room. The session manager 135 may manage user account information of each of members, which constitute the chat room, and additional information such as a TCP connection status of each of the members in a chat session and may process a request associated with the chat session.

According to an embodiment, a session manager 135 may include a session key update controller 136. According to an embodiment, the session key update controller 136 may distribute a session key according to a situation. An example of a detailed situation will be described below. For descriptive convenience, it is assumed that a subject that creates the chat room is the first user and a user invited to the chat room is the second user.

(1) Create the First Chat Room

In the case where the first user creates the chat room of which the members are the first user and the second user, the first user terminal may generate a session key of the chat room. The first user terminal may encrypt the session key and may provide the messenger server 130 with the encrypted session key. The first user terminal may encrypt session keys by using public keys of terminals A, B, and C of the second user, respectively. In other words, the first user terminal may generate the encrypted session keys by the number of terminals of the second user and may provide the messenger server 130 with the encrypted session keys. In this case, the first user terminal may individually send, to the messenger server 130, the session keys respectively encrypted by using public keys of terminals of the second user. Alternatively, to improve efficiency, the first user terminal may gather all session keys and may send the gathered session keys at one time. The session keys may be sent together with an invitation request. The encrypted session keys may be respectively decrypted by using private keys that terminals of the second user have.

The session key update controller 136 may determine the session keys that are suitable for terminals of the second user receiving the invitation request. The messenger server 130 may send the session keys, which are encrypted by using public keys of the terminals, to terminals, respectively.

(2) Invite a New User

According to an embodiment, a third user may be added to the chat room including the first user and the second user. The terminal of the first user may update the session keys with respect to all terminals of the second user being an existing chat room member. Alternatively, the terminal of the first user may update a session key with respect to a terminal A, which accepts the participation in the chat room, from among all terminals of the second user. The first user terminal may request sending an invitation message including a value of the updated session key to all interworking terminals of the third user, which is invited. For example, if receiving a request for inviting the third user from the first user terminal, the session manager 135 may send the invitation message to all terminals of the third user registered in the messenger server 130.

(3) Compulsorily Exit a Chat Room Member

According to an embodiment, in the case where the first user wants to remove the second user from the chat room, the first user terminal may send, to the messenger server 130, a request for compulsory exit including information of the second user that is removed from the chat room. The first user terminal may update a session key with respect to interworking terminals of the remaining members (e.g., the third user) together with the request for compulsory exit or immediately after the request of compulsory exit. Since the updated session key is not sent to any terminal of the second user or since there is no session key encrypted by using the public key of the second user terminal even though the updated session key is sent to any terminal of the second user, the second user terminal may read chat contents after the compulsory exit.

(4) Voluntarily Exit Chat Room Member

In the case where the second user voluntarily exits from the chat room, the messenger server 130 may send an exit event to another user that participates in the chat room. If receiving the exit event of the second user from the messenger server 130, the host of the chat room or a user (for descriptive convenience, it is assumed that the user is the first user), which has an authority to update a session key may update the session key, may encrypt the updated session key by using public keys of user terminals that exist in the chat room, and may send the encrypted session keys to the messenger server 130. According to an embodiment, the messenger server 130 may send the encrypted session keys to terminals of other users corresponding to public keys used for encryption.

In the above-mentioned embodiments, whenever a user enters/exits from the chat room, a session key may be updated, and the updated session key may be sent to all terminals of all users that exist in the chat room. However, according to an embodiment, the updated session key may be sent to only a terminal (e.g., a terminal currently participating in the chat room), which accepts a chat room invitation, from among terminals of all users that exist in the chat room.

Moreover, according to an embodiment, the session key may be updated according to an entrance/exit event. However, whenever a message is sent or whenever messages, of which the number is designated, are sent (e.g., per 300 messages), the session key may be updated. Alternatively, the session key may be updated every fixed period (e.g., per 60 seconds).

According to an embodiment, to execute a "store and forward" operation of forwarding various general messages or a control message, which is requested from the client terminal 100 or is generated in the messenger server 130, to an input terminal, a message manager 137 may provide an upper element with abstraction of a store operation. For example, when processing the request for message transmission from the first user terminal to the second user terminal, the messenger server 130 may store a message through the message manager 137 before forwarding the message to the second user terminal by using the TCP or a push. In the case, the message manager 137 may determine whether to store the message in the inbox 143 or to cache the message in an in-memory placed in the messenger server 130, based on a TCP connection state of the second user terminal. For example, the message manager 137 may not store the message in the inbox 143 whenever sending the message, but it may temporarily cache the message in an in-memory if an input terminal is connected by using the TCP and may remove the cached data in the in-memory if receiving a reception confirmation (i.e., an acknowledgement (ACK) signal) from the input terminal.

According to an embodiment, a data manager 138 may access a database, for example, a RDB, a No-SQL, or the like. For example, the data manager 138 may process a query received from the outside of the messenger server 130.

In the case where the TCP connection between a client terminal and the PS 110 is released, a push manager 139 may request the push system 120 to send a push message.

According to an embodiment, the database 140 may store a messenger/information associated with the message. According to an embodiment, the database 140 may be a separate database server connected with the messenger server 130 and may be implemented in the messenger server 130.

According to an embodiment, the database 140 may store or include user information 141, device information 142, the inbox 143, a message box 144, secure chat room data 145, and secure storage 146. According to an embodiment, the user information 141 may include information about a user account registered through a messenger application. According to an embodiment, the device information 142 may include information about a plurality of devices of each user included in the user information 141. For example, a user may register one device in the messenger server 130, but another user may register a plurality of devices associated with the same account in the messenger server 130.

According to an embodiment, a message, which is not yet completely sent to an input terminal even though the input terminal receives a message transmission request from an output terminal, may be stored in the inbox 143. Alternatively, the inbox 143 may store a message that is not deleted in the client terminal 100. According to an embodiment, to restore a message, the message box 144 may store chat contents (i.e., messages) of the chat room joined with a user account. A message restore function may be used according to user intent or may be fundamentally supported to all users. Alternatively, the message restore function may be used in the case where a plurality of devices is registered with one user account.

According to an embodiment, the secure chat room data 145 may store information about a secure chat room table and an acceptance table. For example, information about creating of the secure chat room, deleting of the secure chat room, adding of a member to the secure chat room, deleting of a member from the secure chat room, the terminal of a member that participates in the secure chat room, or the like may be recorded in the secure chat room table/acceptance table. In the case where a specific user that participates in the chat room requests the leaving of the chat room or where the specific user that participates in the chat room requests the withdrawal from a user account, information about all acceptance tables associated with the user account may be deleted. For example, in the case where the mapping of a device that participates in the chat room is released (e.g., in the case where the device is released from a user account), a device may be released simply, not explicitly exiting the chat room. Accordingly, information about a device that is released from an acceptance table associated with a corresponding account may be deleted.

Moreover, in the case where a terminal corresponding to a user account is invited to the secure chat room and accepts the invitation by using the user account of the invited terminal, information about a terminal that accepts the invitation may be added to the acceptance table associated with the user account. In the case where a user that participates in the secure chat room through the acceptance indirectly requests acceptance cancellation by using another device or directly requests the acceptance cancellation by using the device that accepts the invitation, information about a device that cancels the acceptance may be removed from the acceptance table associated with the account.

According to an embodiment, the secure storage 146 may store data associated with security such as secure key (e.g., public key) of a user account or a secure key of each of devices corresponding to the user account. For example, in the case where the second user registers account information in the messenger server 130 of a terminal A, the messenger server 130 may obtain a public key of the terminal A and may store the public key in the secure storage 146.

As described above, contents described with respect to a secure chat room may be applied to a normal chat. Moreover, according to an embodiment of the present disclosure, the contents associated with security or a secure chat may be to improve security of a messenger service among users and should not be construed as excluding applying of the contents to the normal chat.

The messenger server 130 and messenger service system environment may be modified to be suitable for implementing an embodiment disclosed in the present disclosure. For example, some of elements illustrated in FIG. 1 may be omitted or an element that is apparent to those skilled in the art may be added thereto. According to an embodiment, the PS 110, the push system 120, the messenger server 130, and the database 140 may be included in one or more devices (or a server). For example, the PS 110 and the push system 120 may be included in one server, and the messenger server 130 and the database 140 may be included in another server.

According to an embodiment, at least some of the managers 131 to 139 included in the messenger server 130 may be included in the client terminal 100. For example, the session manager 135 may be included in the client terminal 100, and the remaining managers 131 to 134 and 137 to 139 may be included in the messenger server 130. Hereinafter, an operation environment of a client terminal will be described with reference to FIGS. 2 and 3.

Figure 2:
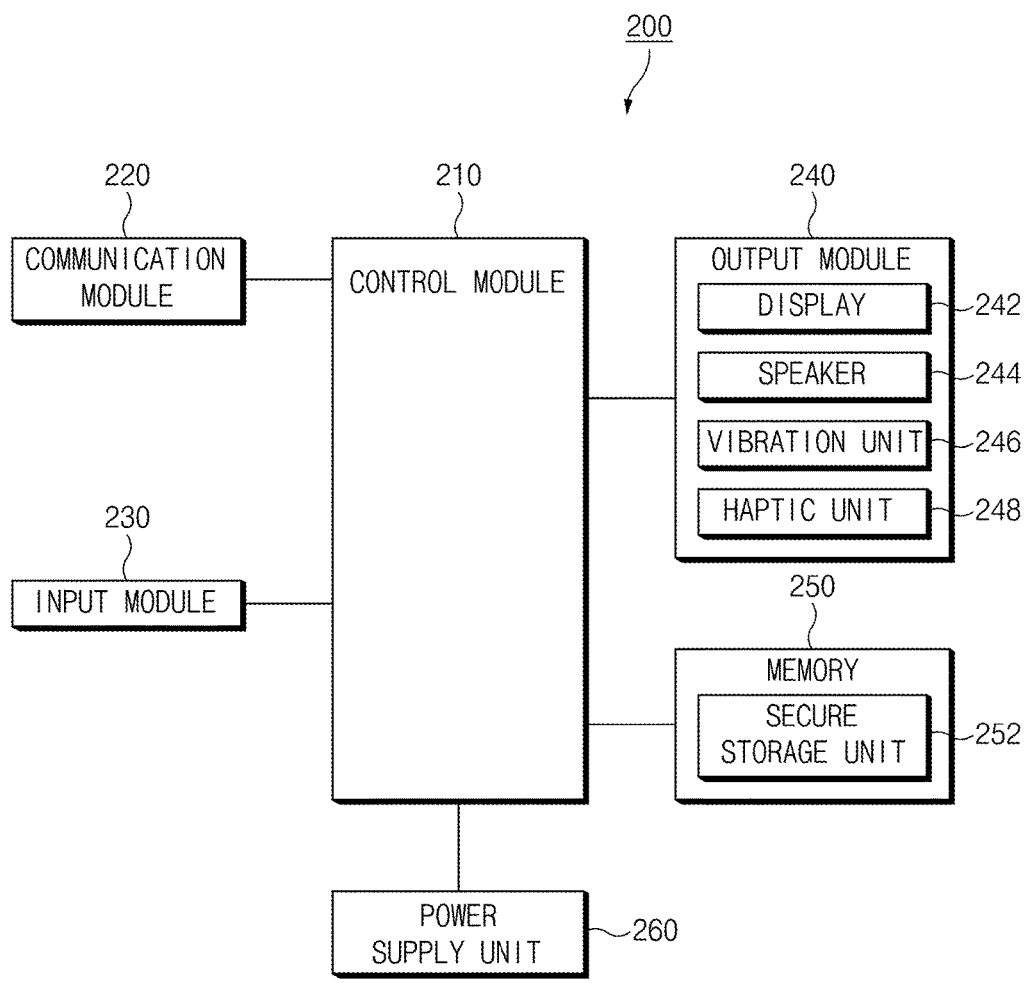
FIG. 2 illustrates a hardware configuration of an electronic device for providing a messenger service, according to an embodiment of the present disclosure.

FIG. 2 illustrates a hardware configuration of an electronic device for providing a messenger service, according to an embodiment of the present disclosure.

Referring to FIG. 2, an electronic device 200 may correspond to, for example, an example of the client terminal 100. An expandable embodiment of the electronic device 200 will be described with reference to FIGS. 16 to 18.

According to an embodiment, the electronic device 200 may include a control module 210, a communication module 220, an input module 230, an output module 240, a memory 250, and a power supply unit 260.

The control module 210 may correspond to, for example, a processor such as an AP. According to an embodiment, the control module 210 may execute/control a messenger application that operates at the electronic device 200 and may access and process data in which security is required.

According to an embodiment, the communication module 220 (or communication circuit) may receive a message from a server (e.g., the messenger server 130) or may send a message to a server. Moreover, the communication module 220 may receive the request for participation in the secure chat room from a server or may send the request to the server. Besides, the communication module 220 may exchange data between a server and a user terminal.

According to an embodiment, the input module 230 may receive a user input from a user. For example, the input module 230 may receive an input for creating/accepting the secure chat room, writing a message, and the like. The input module 230 may include, for example, a touch screen panel (TSP) that is implemented together with a physical keyboard, a software input panel (SIP), or a display 242.

According to an embodiment, the output module 240 may include one or more of the display 242, a speaker 244, a vibration unit 246, and a haptic unit 248. For example, in the case where a message is received or where a notification of a chat room invitation is generated, the electronic device 200 may provide a notification by using sound through the speaker 244 or may generate vibration by using the vibration unit 246 therein. Moreover, the electronic device 200 may provide a visual notification/message regarding chat contents or an invitation notification through the display 242.

According to an embodiment, the memory 250 may store data associated with a messenger application, message contents, information about a user account, and the like. According to an embodiment, a portion of data stored in the memory 250 may be synchronized with data stored in a server. According to an embodiment, the memory 250 may also store an acceptance table.

According to an embodiment, the power supply unit 260 may correspond to a battery or a wired or wireless charging circuit. According to an embodiment, the power supply unit 260 may be directly or indirectly connected to hardware that constitutes the electronic device 200 and may power the hardware.

Figure 3:
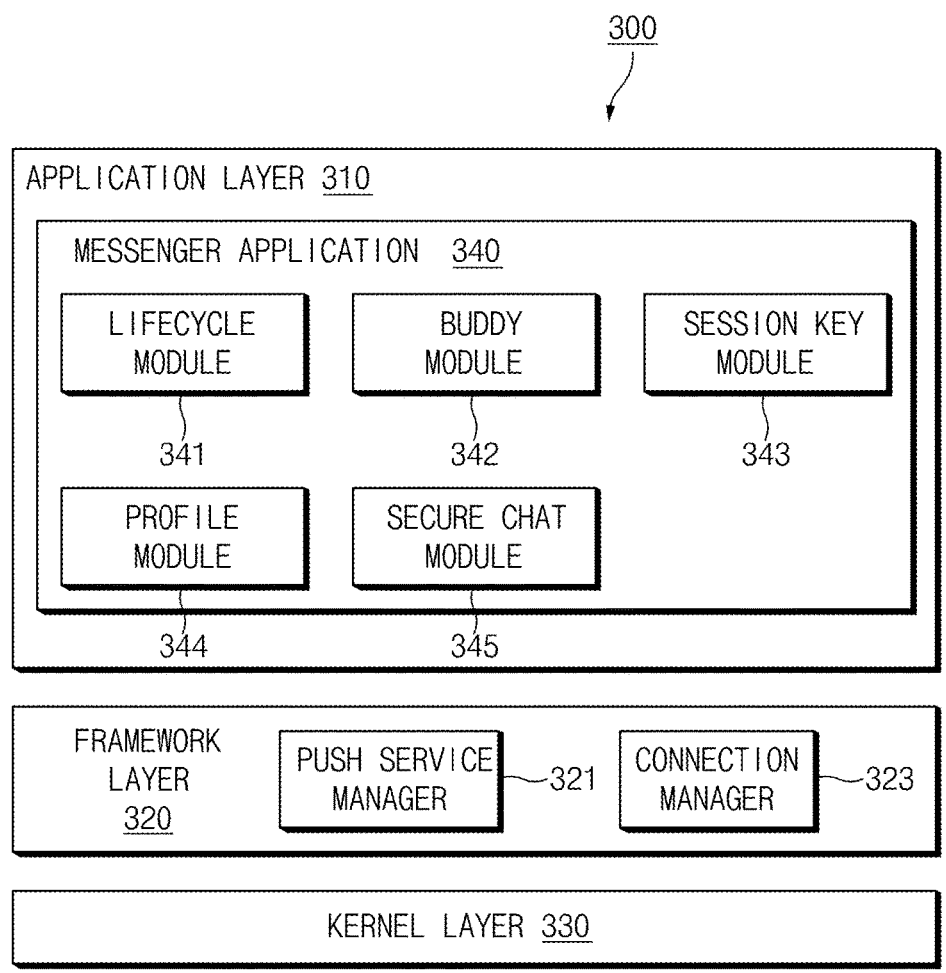
FIG. 3 illustrates a software configuration of an electronic device for providing a messenger service, according to an embodiment of the present disclosure.

FIG. 3 illustrates a software configuration of an electronic device for providing a messenger service, according to an embodiment of the present disclosure.

Referring to FIG. 3, a software operation environment 300 of the electronic device 200 may include an application layer 310, a framework layer 320, and a kernel layer 330.

According to an embodiment, the framework layer 320 may operate on the kernel layer 330. According to an embodiment, the framework layer 320 may include a push service manager 321 and a connection manager 323. According to an embodiment, the push service manager 321 may process a push notification of the electronic device 200. For example, in the case where the electronic device 200 is not connected to the PS 110 when sending a message from the messenger server 130 to the electronic device 200, the messenger server 130 may forward a push notification through the push system 120. If receiving the push notification, the communication module 220 may forward the push notification to the push service manager 321 of the framework layer 320, and the push service manager 321 may process the push notification. As the processed result, the push notification may be provided according to settings of the electronic device 200 through the output module 240.

According to an embodiment, the connection manager 323 may be in charge of the TCP connection between the electronic device 200 and the PS 110. According to an embodiment, to monitor a channel of a zombie state, the connection manager 323 may execute a keep-alive operation. Moreover, the connection manager 323 may be in charge of encryption of a channel itself. For example, the encryption of a channel itself may correspond to encryption of an immediately upper layer of the TCP, such as a secure sockets layer (SSL)/transport layer security (TLS).

According to an embodiment, a messenger application 340 may operate in the application layer 310. The messenger application 340 may include a lifecycle module 341, a buddy module 342, a session key module 343, a profile module 344, and a secure chat module 345. Each module is exemplarily defined based on a function thereof and is implemented in another form or has another name.

According to an embodiment, the lifecycle module 341 may obtain the list of servers, which the lifecycle module 341 will connect to, before subscribing a messenger service and may periodically update the server list after subscribing the messenger service. Moreover, in a subscription process, the lifecycle module 341 may process a clause and a license and may authenticate a user terminal. According to an embodiment, the lifecycle module 341 may activate/deactivate some of functions based on a license of a client (or a user account). Besides, the lifecycle module 341 may be in charge of a function associated with an overall lifecycle, for example, withdrawal from a user account or mapping/mapping release of a user terminal.

According to an embodiment, the buddy module 342 may register, delete, edit, check, or manage a chat counterpart for each group. According to an embodiment, the session key module 343 may generate and update a session key used in the chat room, may obtain or manage a public key, and may recognize that a session key is updated.

According to an embodiment, the profile module 344 may manage personal information such as the name, the nickname, the e-mail, the profile picture, or the like of a chat counterpart including a user. The secure chat module 345 may process creating of the secure chat room, deleting of the secure chat room, inviting of the secure chat room, entering of the secure chat room, compulsory exiting from the secure chat room, or exiting from the secure chat room. The secure chat module 345 may request to forward a chat message or may receive the chat message.

Hereinafter, a process and a user interface (UI) associated with generating and participating in the secure chat room between the user terminal and a server will be described with reference to FIGS. 4 to 15.

According to various embodiments of the present disclosure, the chat room may denote a chat room that is configured such that a server that encrypts chat contents (or a message) by using an encryption function between end-to-end terminals and forwards the encrypted chat contents does not read corresponding chat contents. Moreover, according to various embodiments of the present disclosure, the chat room may denote a chat room of which the chat contents are not encrypted. According to various embodiments of the present disclosure, a symmetric key manner using the same session key may be used. However, according to another embodiment, a manner of encrypting a message by using an asymmetric key (e.g., a public key-a private key) of each end-to-end terminal may be used. However, in various embodiments of the present disclosure, even though a session key of a symmetric key type is used, the session key may be encrypted by using a public key of each user terminal, and the encrypted session key may be sent to the terminal of a chat counterpart. That is, according to an embodiment, since a server that does not have a private key of a terminal does not obtain a session key, the server may not read chat contents.

According to an embodiment, a messenger application that supports a service with respect to a plurality of devices disclosed in the present disclosure may synchronize a message between terminals. According to an embodiment, the messenger application may synchronize the chat room list therewith. According to an embodiment, the messenger application may restore a message. For example, even though the electronic device 200 deletes a message, the messenger application may restore the deleted message within a designated time. According to an embodiment, the operation of the above-described messenger application may be supported in the case where two or more user terminals are registered with one user account. However, according to another embodiment, the operation may be fundamentally supported with respect to terminals of all accounts.

Figure 4:
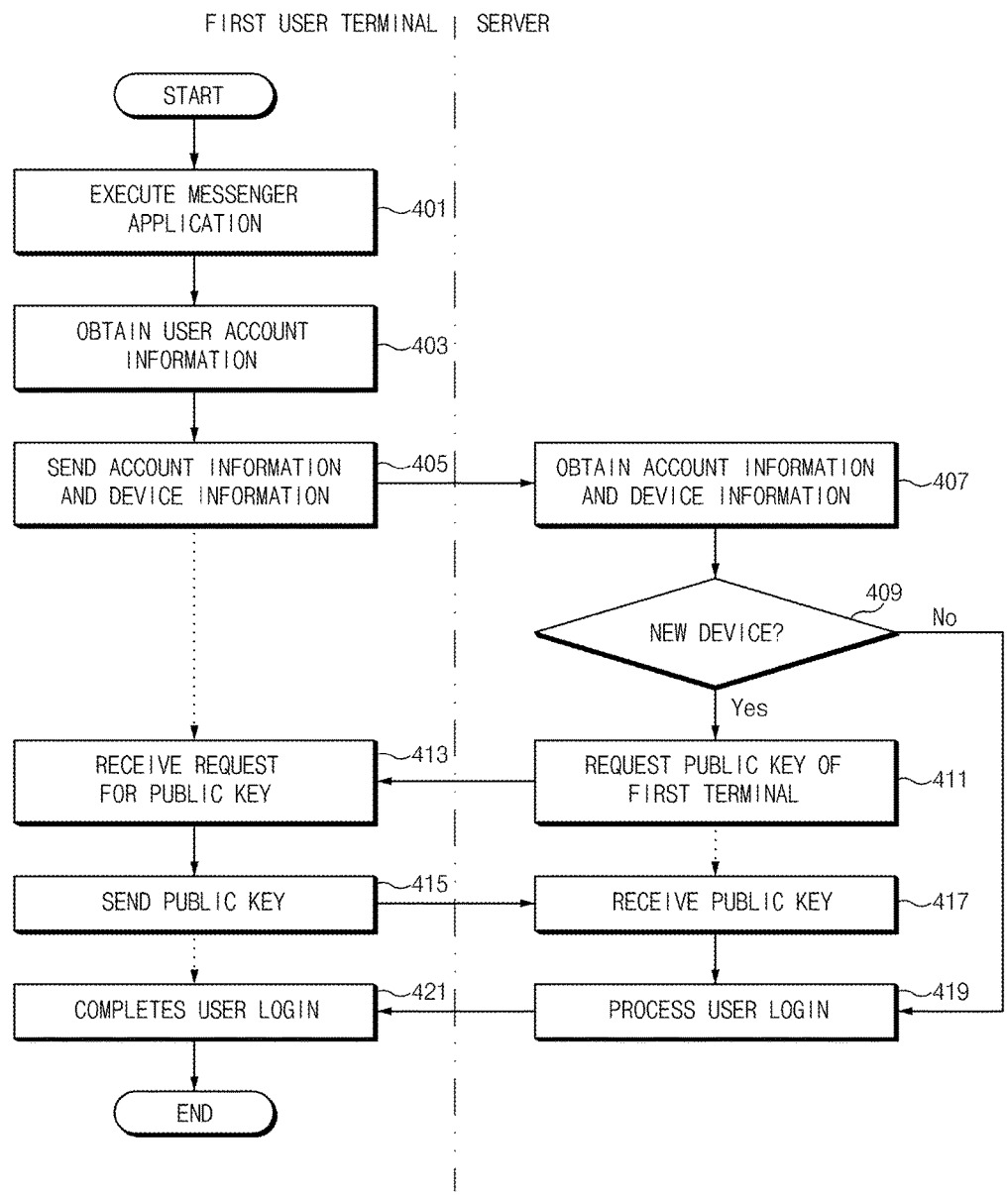
FIG. 4 illustrates a registration process of a user terminal, according to an embodiment of the present disclosure.

FIG. 4 illustrates a registration process of a user terminal, according to an embodiment of the present disclosure.

Referring to FIG. 4, a first user terminal may correspond to the electronic device 200, and a server may correspond to the messenger server 130. In operation 401, the first user terminal may execute a messenger application. The execution in operation 401 may correspond to the first execution of the messenger application or an execution before a user account is registered in the messenger application. Moreover, according to an embodiment, the execution in operation 401 may correspond to an execution for deleting a user account of an existing messenger application and registering a new user account.

In operation 403, the first user terminal may obtain user account information. For example, the first user terminal may obtain the identification (ID), the name, the password, the e-mail address, the fingerprint recognition information, and the like of a user through the input module 230.

In operation 405, the first user terminal may send the obtained user account information to the server. Moreover, the first user terminal may additionally send device information of the first user terminal to the server. The device information may include identification information (e.g., a product identification number, a model name, a model number, international mobile equipment identity (IMEI), or specific information that a server sends in the case where there the first user terminal has communicated with the server, or the like) of the first user terminal.

In operation 407, the server may obtain account information and device information from the first user terminal. In operation 409, the server may determine whether the first user terminal is a new device, by using the user account information and the device information. For example, in the case where the device information includes the fact that the first user terminal is a device that has not been registered in the server even once, the server may determine the first user terminal as the new device. Alternatively, even though the device information includes the fact that the first user terminal is a device that is registered in the server, in the case where the first user terminal is registered with not a first user account but another user account, the server may determine the first user terminal as the new device based on the first user account. In the latter, the server may delete the device information of the first user terminal from device information associated with the second user account.

In the case where it is determined that the first user terminal is not the new device, the server may determine that an existing terminal (i.e., the first user terminal) attempts to log in with the first user account, and in operation 419, the server may process user login. In the case where it is determined that the first user terminal is the new device, in operation 411, the server may request the public key of the first user terminal from the first user terminal. Although not described, according to another embodiment, even though it is determined that the first user terminal is not the new device, the server may request the public key of the first user terminal from the first user terminal.

In response to receiving the request for the public key from the server in operation 413, the first user terminal may send the public key of the first user terminal to the server in operation 415. For example, the public key of the first user and the public key of the first user terminal may be distinguished in terms of the following. The public key of the first user may be generated in connection with account information of the first user. In the case where the server accesses account information of the first user (e.g., login), the server may obtain the private key of the first user. Accordingly, even though the first user logs in to any device, contents encrypted by using the public key of the first user may be decrypted. On the other hand, the public key of the first user terminal may be generated in connection with the first user account and device information of the first user terminal, and even though logging in with the first user account, another terminal of the first user, which is not the first user terminal, may not obtain the private key of the first user terminal. Accordingly, in the case where a user chats in a secure chat room by using a smartphone, the user may not confirm secure chat contents through a tablet that logs in with the same account.

In operation 417, the server may receive the public key from the first user terminal. The received public key may be stored in, for example, the secure storage 146. In operation 419, the server may not only register the first user account and/or the first user terminal, but it may allow the user to log in. If the server completes user login processing, the login is completed in the first user terminal in operation 421, and thus the user may utilize a messenger application with the first user account.

Figure 5:
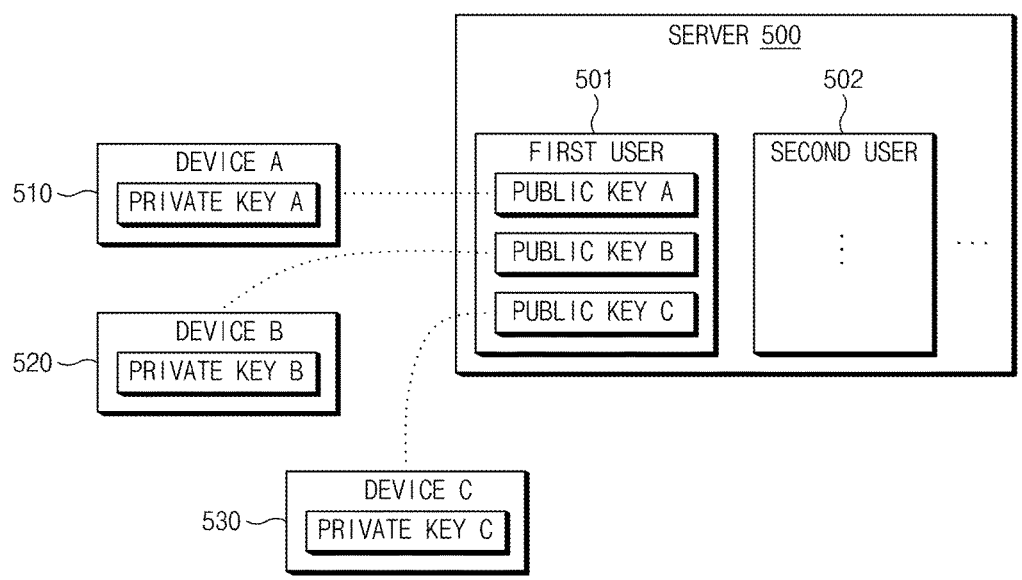
FIG. 5 illustrates a relationship of a public key and a private key, according to an embodiment of the present disclosure.

FIG. 5 illustrates a relationship of a public key and a private key, according to an embodiment of the present disclosure.

According to an embodiment, a first user may repeatedly perform a process of FIG. 4 by using another terminal. For example, after installing a messenger application in a smartphone and completing user registration, the first user may install a messenger application corresponding to a tablet and may attempt to register a user.

Referring to FIG. 5, for example, in the case where each of a device A 510, a device B 520, and a device C 530 associated with the first user account repeatedly executes the process of FIG. 4 with respect to a server 500, public keys A, B, and C of the devices A, B, and C of the first user may be stored in a secure storage space 501 of the first user in the server 500. There may be private keys A, B, and C (or is capable of decrypting contents encrypted by using a public key) respectively corresponding to the public keys in the devices A, B, and C of the first user. In the case where the second user executes the same operation, the server 500 may store a public key corresponding to the terminal of the second user in a secure storage space 502 of the second user in the same manner. For example, the secure storage space 501 or 502 may correspond to the secure storage 146 of the messenger server 130.

According to an embodiment, the asymmetric key of a user account may be used instead of the asymmetric key of a terminal. In this case, when a user account is generated for the first time, a first terminal may arbitrarily generate an asymmetric key (i.e., a public key/private key) and may register a public key in the server. Afterwards, in the case where the second terminal being another terminal is registered with the same account, encryption/decryption, which is performed by using an asymmetric key of the account when a message is sent/received with the corresponding account, may be possible by sending a private key generated at the first terminal to a second terminal to be registered. In this case, a user may directly input a value of the private key of the first terminal in the process of registering the second terminal by sending the private key of the account from the first terminal of the account to the second terminal thereto. According to an embodiment, a user may not directly input a value of a private key in the process of registering a terminal, but the user may utilize a temporary asymmetrical key upon sending the private key of a user account from the first terminal to the second terminal. For example, the second terminal may generate a temporary public key and a temporary private key and may provide the temporary public key to the first terminal through the server. If the first terminal encrypts a private key of the user account by using the temporary public key of the second terminal and again sends the encrypted private key of a user account to the second terminal, the second terminal may decrypt "the private key of the user account encrypted by using the temporary public key" by using the temporary private key. The above-described method may allow a private key to be shared among a plurality of terminals of the same user account.

Figure 6:
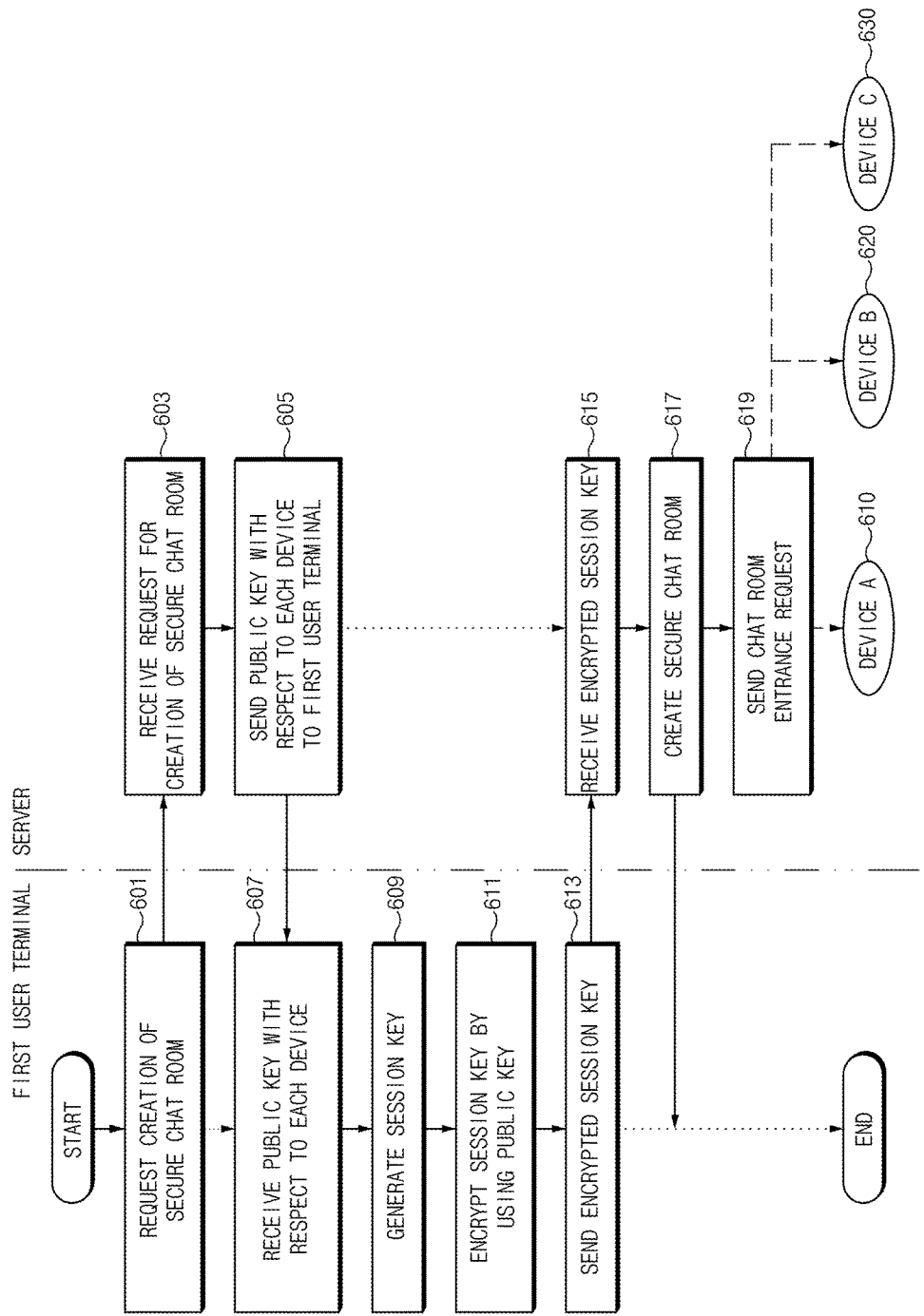
FIG. 6 illustrates a chat room creating process according to an embodiment of the present disclosure.

FIG. 6 illustrates a chat room creating process according to an embodiment of the present disclosure.

Referring to FIG. 6, a process is illustrated in which a first user terminal creates the secure chat room including a second user account through a server. Moreover, according to an embodiment, in the case where the secure chat room additionally including a plurality of user accounts such as a third user or a fourth user in addition to a first user account and a second user account is created, the same process may be applied to each of the users. In operation 601, the first user terminal may send a request for creation of the secure chat room, which includes the first user and the second user, to a server. In operation 603, the server may receive the request for creation of the secure chat room from the first user terminal.

In operation 605, the server may send, to the first user terminal, a plurality of public keys respectively corresponding to a plurality of terminals (e.g., a device A 610, a device B 620, and a device C 630) corresponding to the account of the second user being a member of the secure chat room. For example, in the case where the number of terminals corresponding to the second user account is three, the server may send three different public keys to the first user terminal.

In operation 607, the first user terminal may receive the public keys respectively corresponding to the second user terminals from the server. In operation 609, the first user terminal may generate a session key of the secure chat room. In operation 611, the first user terminal may encrypt the session key by using the public keys. For example, in an above example, three different encrypted session keys may be generated.

In operation 613, the first user terminal may send the encrypted session keys to the server. The first user terminal may separately send the encrypted session keys or may send the encrypted session keys as a data packet. In this case, information of the second user terminal corresponding to each of the encrypted session keys may be included in the data packet.

In operation 615, the server may receive the encrypted session keys. In operation 617, the server (e.g., the secure chat room manager 134) may create the secure chat room and may send, to the first user terminal, the fact that the secure chat room is created. In operation 619, the server may send a chat room entrance request to each of the terminals, that is, the device A 610, the device B 620, and the device C 630, which correspond to the second user account. In this case, the server may send, to each of the terminals, the encrypted session keys corresponding to the terminals may be sent to the terminals together with the chat room entrance request. Alternatively, the server may send a session key, which is encrypted by using a public key of a terminal, to only the terminal that accepts the chat room entrance request and corresponds to the second user account.

The process illustrated in FIG. 6 may be modified. For example, the process may proceed to operations 617 and 619 from operation 603. In this case, if receiving a chat room participation acceptance request from a second user terminal (e.g., the device B 620), the server may send only the public key of the device B 620 to the first user terminal, and the first user terminal may generate an encrypted session key of the device B 620 and may send the encrypted session key to the server. The server may again send the encrypted session key to the device B 620, and the device B 620 may decrypt the encrypted session key by using the private key of the device B 620 and may read chat contents by using the decrypted session key.

Moreover, in a modified embodiment, operations 605 and 607 may be omitted or may be previously executed. For example, the first user terminal may previously receive, from the server, all the public keys of the registered terminals of chat counterparts of the first user registered in a messenger application and may store the received public keys in a memory (e.g., a secure storage unit 252) of the first user terminal. In this case, operations 605 and 607 may be omitted upon creating of a secure chat room.

Figure 7:
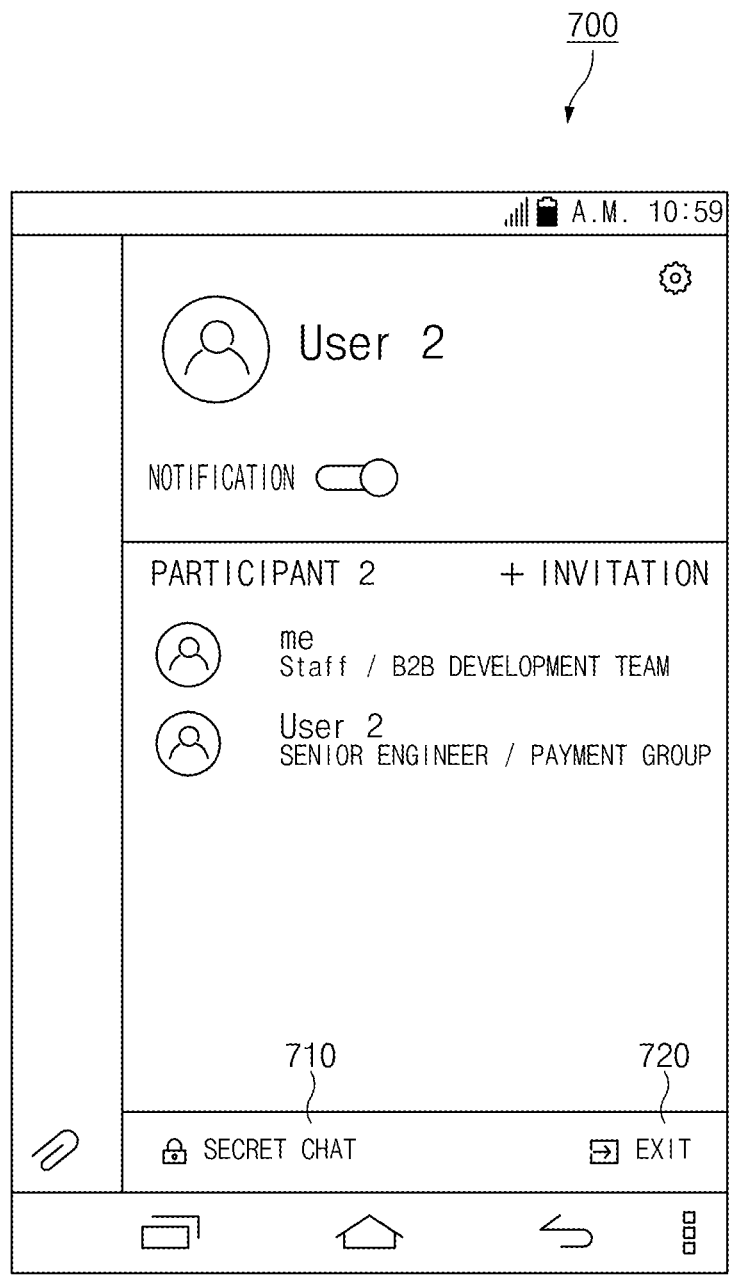
FIG. 7 illustrates an interface for changing a secure chat room into a normal chat room, according to an embodiment of the present disclosure.

FIG. 7 illustrates an interface for changing a secure chat room into a normal chat room, according to an embodiment of the present disclosure.

Referring to FIG. 7, according to an embodiment, the normal chat room including a first user (me) and a second user (user 2) may be created in screen 700. For example, end-to-end encryption may not be applied to the normal chat room, or not a user terminal-based encryption method of the above-mentioned secure chat room but another encryption method (e.g., user account-based encryption) may be applied thereto. According to an embodiment, in the case where the first user selects a secret chat menu 710 for changing a current normal chat room into the secure chat room (e.g., the chat room in which the chat contents are encrypted and sent) in a state in which the normal chat room is created, the process of FIG. 6 may be executed. The chat contents in the normal chat room may be confirmable in all the devices A, B, and C corresponding to the second user account, but after the normal chat room is changed into the secure chat room, the chat contents may be confirmable in only a device that accepts a chat room entrance request.

In the above embodiment, a security level of the encryption of the chat contents before the normal chat room is changed into the secure chat room may be relatively low. For example, in the case where a malicious user installs a program for hacking chat contents in the terminal of a user, it may be possible to confirm chat contents of the normal chat room that is hacked and stolen, but it is impossible to confirm chat contents of the secure chat room because the chat contents are encrypted. However, in the case where the attributes of the chat room are changed when the normal chat room is changed into the secure chat room, it may be still possible to steal chat contents when the chat contents are exchanged in the normal chat room. In this case, a user may exit from the normal chat room through an exit menu 720, may completely delete the chat contents of the normal chat room, and may newly create a new secure chat room based on the process of FIG. 6. According to an embodiment, messenger security may be improved by downloading chat contents between the first user and the second user from the server through the message restore function and again encrypting the downloaded chat contents through a session key of the secure chat room.

Figure 8:
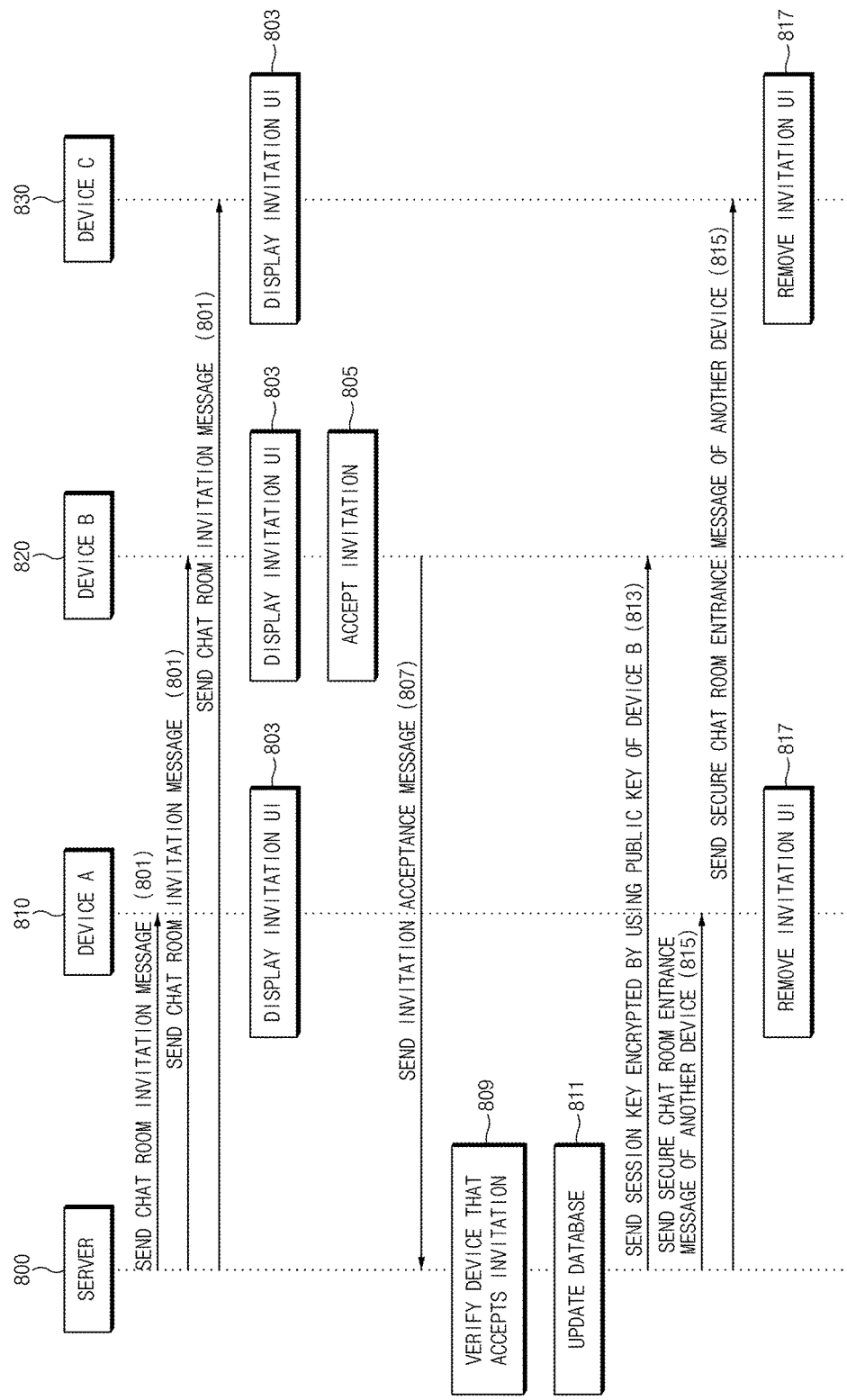
FIG. 8 illustrates a chat room entering process according to an embodiment of the present disclosure.

FIG. 8 illustrates a chat room entering process according to an embodiment of the present disclosure.

Referring to FIG. 8, according to an embodiment, it is understood that the process of FIG. 8 is a process executed between a server and each of second user terminals following the operation 619 of FIG. 6. In FIG. 8, a server 800 may correspond to the messenger server 130. A device A 810, a device B 820, and a device C 830 may respectively correspond to the device A 610, the device B 620, and the device C 630 that are the second user terminals. Moreover, a configuration of the electronic device illustrated in FIGS. 2 and 3 may be also applied to the second user terminals.

In operation 801, the server 800 may send a chat room invitation message (i.e., an entrance request) to the device A 810, the device B 820, and the device C 830. In operation 803, the second user terminals that receive the chat room invitation message may display an invitation UI such as an invitation message or invitation notification popup associated with the chat room on a display (e.g., the display 242).

Figure 9:
FIG. 9 illustrates a chat room invitation screen, according to an embodiment of the present disclosure.

FIG. 9 illustrates a chat room invitation screen, according to an embodiment of the present disclosure.

Referring to FIG. 9, a UI such as a screen 900 may be displayed. The screen 900 may include a title 910 of a secret chat room, information 920 (e.g., information indicating that a message is encrypted in a terminal, that copying/sharing/forwarding of the message is limited, that a screen capture is limited, that a time when a user is capable of participating in a chat room is limited, or the like) about the secret chat room, and a secret chat participation menu 930 for accepting participation in the secret chat room. The screen 900 may be variously modified. For example, a menu such as a popup when another program (or application) is executed or in a home screen or the like may be provided as a chat room acceptance request UI.

Referring to FIG. 8, in the case where the device B 820 accepts an invitation of the chat room in operation 805, in operation 807, the device B 820 may send an invitation acceptance message to the server 800. In this case, according to an embodiment, the invitation UI displayed on the device A 810 and the device C 830 may be maintained.

If receiving the invitation acceptance message, in operation 809, the server 800 may verify a device that sends the invitation acceptance message. In operation 811, the server 800 may update a database. Here, the database may be an acceptance table stored in the secure chat room data 145. For example, the server 130 may add (or register) information about the device B 820 as an acceptance device to (or in) the acceptance table stored in the secure chat room data 145.

In operation 813, the server 800 may send the encrypted session key to the device B 820. Here, the session key may correspond to the session key encrypted by using the public key of the device B 820 (refer to operation 611). Afterwards, the device B 820 may decrypt a session key by using the private key of the device B 820 and may decrypt/encrypt a message, which is received from the server 800 or is sent to the server 800, by using the session key.

In operation 815, the server may send an entrance message, which indicates that another device (e.g., the device B 820) enters a chat room, to the device A 810 and the device C 830. If receiving the message, in operation 817, the device A 810 and the device C 830 may remove the invitation UI. Afterwards, in the case where the device A 810 or the device C 830 selects a secure chat room list, in which the device B 820 participates, from among chat room lists, an entrance rejection message (or an image) illustrated in FIG. 13 may be outputted.

According to an embodiment, the process of FIG. 8 may be modified. For example, in operation 813, a session key encrypted by using each public key may be sent to the device A 810 and the device C 830. However, since the device A 810 or the device C 830 is not a device that accepts participation in the secure chat room, for example, the device A 810 and the device C 830 may not perform decryption with respect to the encrypted session key and chat contents. For example, the device A 810 and the device C 830 may execute only a task for storing the encrypted session key and the encrypted chat contents, which will be described with reference to FIG. 10.

Figure 10:
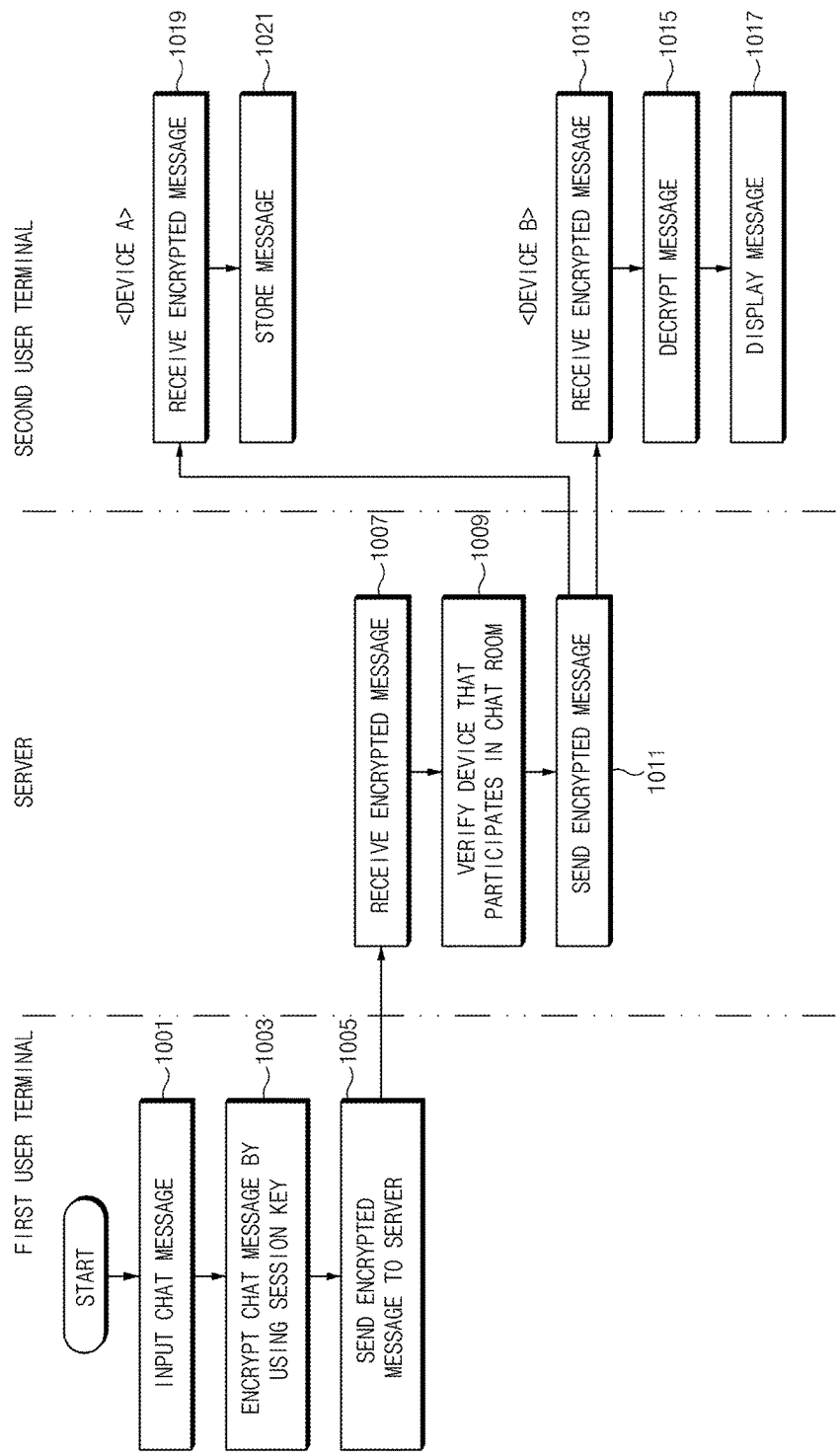
FIG. 10 illustrates a process of forwarding a message in a chat room, according to an embodiment of the present disclosure.

FIG. 10 illustrates a process of forwarding a message in a chat room, according to an embodiment of the present disclosure.

Referring to FIG. 10, a process of forwarding a message from a first user account to a second user account through a server is illustrated. In operation 1001, a chat message may be inputted in the first user terminal. For example, the message may be inputted through the input module 230.

In operation 1003, the first user terminal may encrypt a message by using a session key of the chat room. In operation 1005, the first user terminal may send the message encrypted by using a session key to the server.

In operation 1007, the server may receive the encrypted message. The server may have a session key encrypted by using the public key or public key of each user terminal. However, since not having a private key corresponding to a public key, the server may not obtain the session key through decryption. Accordingly, even though obtaining the message encrypted by using the session key, the server may not decrypt the message.

In operation 1009, the server may verify a terminal, which participates in the secure chat room, from among terminals of the registered second user. For example, in the case where a terminal (i.e., a device B) among the terminals of the second user participates in the secure chat room (e.g., in the case where the device B accepts an invitation request of the secure chat room first) or where the device B is registered in an acceptance table, the server may determine the device B as a device that participates in the secure chat room. In operation 1011, the server may send the encrypted message to the verified device B.

In operation 1013, the device B may receive the encrypted message from the server. In operation 1015, the device B may decrypt the message by using a session key obtained through the private key of the device B. In operation 1017, the device B may output the decrypted message to a display of the device B.

According to an embodiment, the encrypted message may not be sent to the device A that is not registered in an acceptance table. According to another embodiment, the encrypted message may be sent to the device A that is not registered in an acceptance table. In operation 1011, the encrypted message may be also sent to the device A. In this case, the server may store the encrypted message and may send a control message for prohibiting decryption to the device A. The control message may include a command for prohibiting a notification indicating the reception of the encrypted message. In operation 1019, the device A may receive the encrypted message. In operation 1021, the device A may store the received message. That is, the device A is capable to receive the encrypted message and is also capable to have a session key, however since the device A does not provides notification of reception of the message nor display the message on a display by decrypting the encrypted message, the user is not able to confirm contents of the secure chat room through the device A that is not a participation acceptance device (e.g., the device B).

For example, the case that only operations 1019 and 1021 are performed may provide higher security than the case that operations 1019 and 1021 as well as operations 1013 to 1017 are executed. In the latter, a user may not confirm chat contents of the secure chat room, but the chat contents may be hacked through a malicious program or the like. However, in the case where participation acceptance is possible in a plurality of devices as described in FIG. 11 or where the secure chat room is moved to another device as described in FIG. 14, for example, efficiency may increase because the device A already has chat contents and the server sends only a control message for permitting decryption and display.

Figure 11:
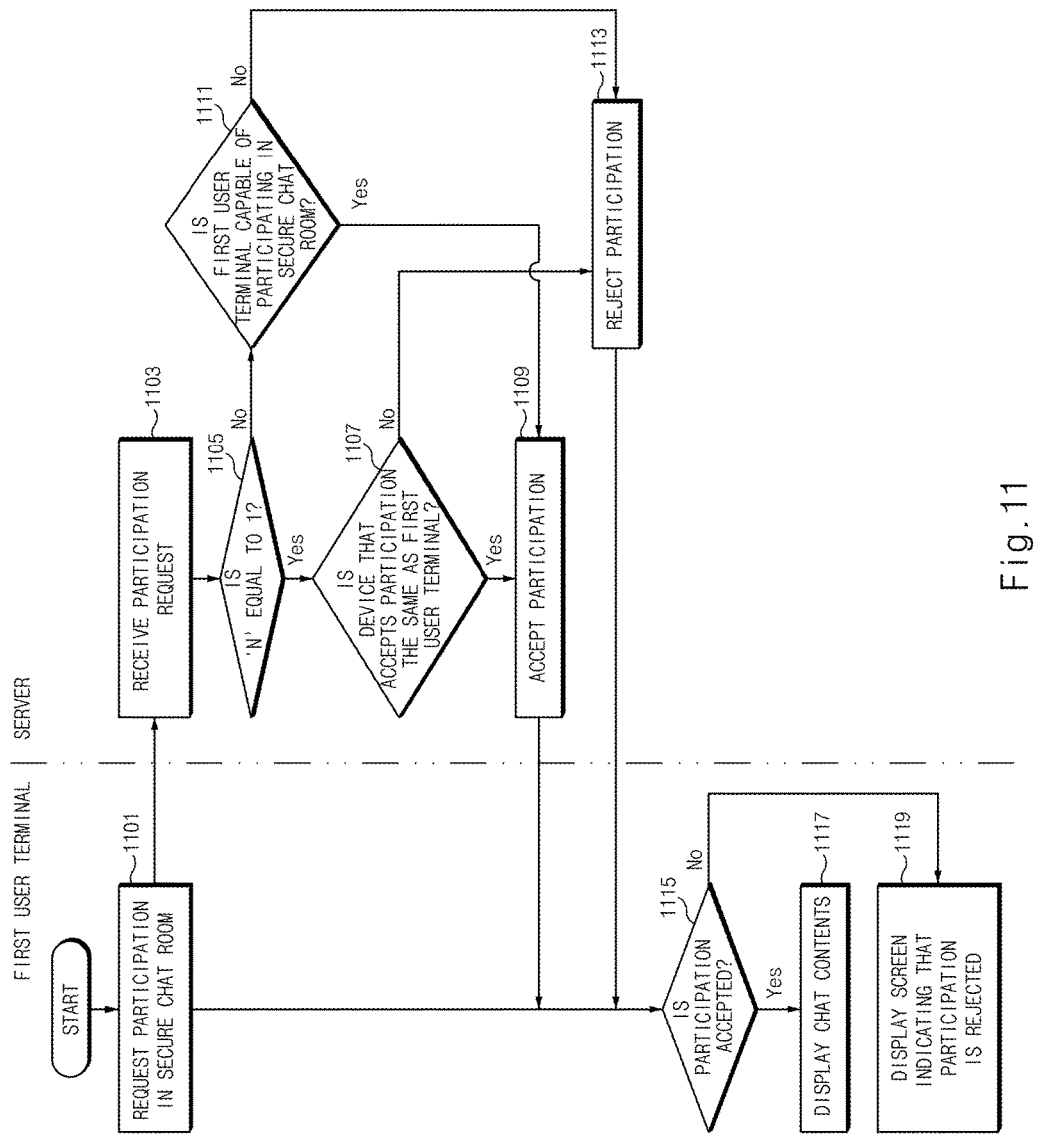
FIG. 11 illustrates a process in which a plurality of devices of the same user participates in a chat room, according to an embodiment of the present disclosure.

FIG. 11 illustrates a process in which a plurality of devices of the same user participates in a chat room, according to an embodiment of the present disclosure. The process of FIG. 11 corresponds to a situation in which another terminal (e.g., a terminal 1) of a first user account already accepts participation in the secure chat room but a first user terminal (e.g., a terminal 2) participates in the secure chat room.

Referring to FIG. 11, a process is illustrated in which another terminal (e.g., a terminal 1) of a first user account already accepts participation in the secure chat room but a first user terminal (e.g., a terminal 2) participates in the secure chat room. In operation 1101, the first user terminal (e.g., the terminal 2) may request participation in the secure chat room. For example, the first user terminal may select the secure chat room, in which another device (e.g., the terminal 1) already participates, from a chat room list provided by a messenger application. For example, the first user terminal may display, on a display, the list of a plurality of chat rooms joined with a first user account through the messenger application.

Figure 12:
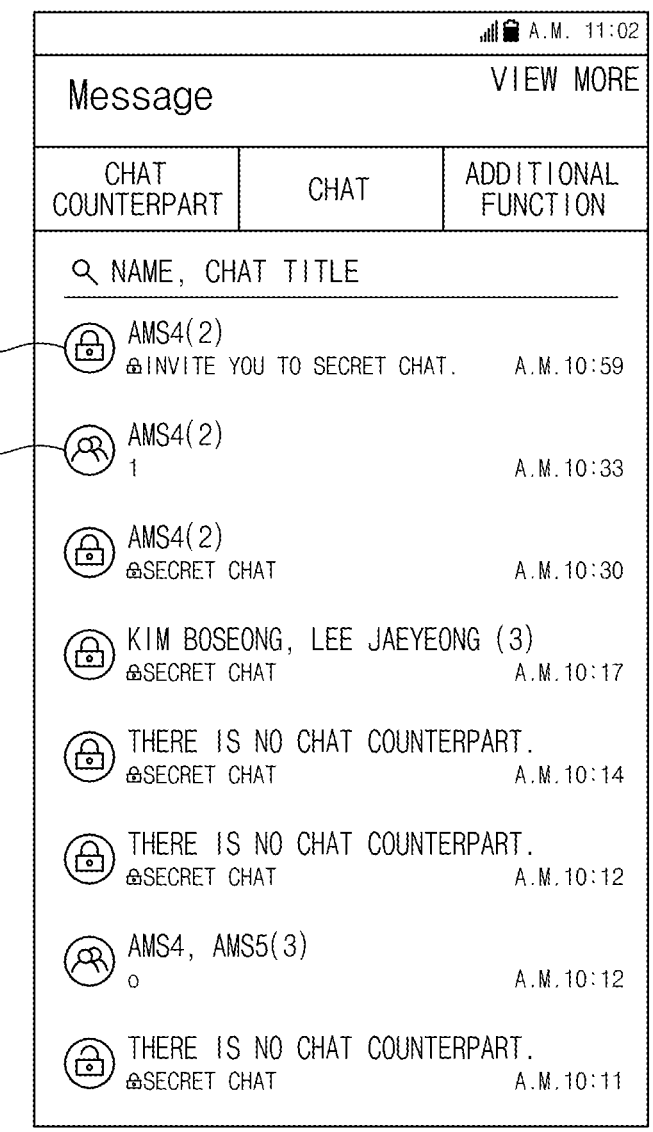
FIG. 12 illustrates a screen for displaying a chat room, according to an embodiment of the present disclosure.

FIG. 12 illustrates a screen for displaying a chat room, according to an embodiment of the present disclosure.

Referring to FIG. 12, a chat room (e.g., a first chat room type) in which the first user terminal (e.g., the terminal 2) participates and a chat room (e.g., a second chat room type) in which another terminal (e.g., the terminal 1) of the first user participates may be displayed on the chat room list in screen 1200. According to an embodiment, each chat room may be displayed according to a type of chat room by using different manners. For example, in an example of FIG. 12, an icon 1210 and an icon 1220 having different forms may be arranged in front of the title of the chat room of the second chat room type and the first chat room type. However, in another example, the first chat room type and the second chat room type may be displayed such that the first chat room type and the second chat room type are distinguished with each other by using different colors or flags.

Referring to FIG. 11, in operation 1103, the server may receive a secure chat room participation request from the first user terminal. In operation 1105, the server may verify the maximum number (n) (e.g., n=1) of devices that are capable of accepting an invitation (or are capable of participating in the secure chat room) with one user account (e.g., the first user account).

In operation 1105, the server may determine whether 'n' is equal to 1. In other words, the server may verify whether one user terminal is set such that only the user terminal is capable of participating in the secure chat room for each user account. According to an embodiment, the setting may be determined by a user, or may be determined by a messenger application itself, a messenger server, or a system administrator (e.g., a secure administrator of a company).

For example, in the case where 'n' is equal to 1, in operation 1107, the server may determine whether a device that has accepted participation in the secure chat room is the same as the first user terminal. In the case where the device is the same as the first user terminal, in operation 1109, the server may accept participation of the first user terminal. In other words, the server may permit the first user terminal to enter the secure chat room. For example, this may correspond to the case where the first user terminal terminates a messenger application and again enter the secure chat room after accepting a secure chat room invitation.

For example, in the case where 'n' is equal to 1 and where the device that accepts the participation is different from the first user terminal, in operation 1113, the server may reject participation in the secure chat room. For example, this may correspond to the case where a smartphone accepts participation in the secure chat room and then a tablet attempts to participate in the secure chat room.

According to an embodiment, in the case where 'n' is equal to 1, the messenger application may operate in a restricted mode in which only a device that accepts an invitation request first is permitted to again enter the secure chat room. In this case, a secure chat room move described below may not be supported.

According to an embodiment, usability of the chat room may be determined based on the maximum number (n) of devices that is capable of accepting an invitation (or is capable of participating in the secure chat room). For example, since data of a (secure) chat room is stored in only one device in the case where 'n' is equal to 1, disclosure of chat contents may be prevented. In the case where 'n' is not equal to 1, for example, in the case where five devices are permitted to participate in the chat room (i.e., n=5), according to an embodiment, the usability of the same level as that of a normal chat room may be provided. However, according to an embodiment of the present disclosure, chat contents may be used at an end-to-end encryption system. Accordingly, security of the chat room may be improved.

According to an embodiment, since other persons are capable of reading a message in the case where one or more of a plurality of devices that are permitted to participate therein are lost or where the ownership thereof is transferred to another person, another device may release the mapping of a corresponding device or may monitor whether the corresponding device is in an idle state and may allow a system (e.g., the messenger server 130) to release the mapping of the corresponding device as the monitored result.

According to an embodiment, a threat to disclosure of a message encrypted through acceptance cancellation may be minimized. For example, a specific device may cancel acceptance, or another device (e.g., mirror devices) of a user account that is in an acceptance state may cancel the acceptance of a specific device. Moreover, if the acceptance is canceled, a device that cancels the acceptance may be set such that the device does not read a message any more by accessing the secure chat room. According to an embodiment, after the acceptance is canceled, the device may be set such that re-acceptance is possible. However, the re-acceptance may be possible in a state in which at least one device is accepted. A device that cancels the acceptance may delete all chat contents of a corresponding secure chat room and may maintain the secure chat room itself. In this case, a button for the re-acceptance may be provided to a user.

In the case where 'n' is not equal to 1, in operation 1111, the server may determine whether the first user terminal satisfies a condition in which the first user terminal is capable of participating in the secure chat room. For example, the server may determine whether the first user terminal is capable of participating in the secure chat room, by comparing a value of the set 'n' with the number of terminals that currently participate in the secure chat room. As the determination result, in the case where the first user terminal is capable of participating in the secure chat room, in operation 1109, the server may accept the participation. Otherwise, in operation 1113, the server may reject the participation.

In operation 1115, the first user terminal may determine whether a message received from the server is participation acceptance or participation rejection. In the case where the participation is accepted, the first user terminal may receive chat contents of a secure chat room together with the encrypted session key from the server. In operation 1117, the first user terminal may display chat contents on a display by decrypting the chat contents. According to an embodiment described above, the first user terminal may decrypt the encrypted chat contents stored in a memory and may display the decrypted chat contents on a display. In the case where the participation is rejected, in operation 1119, the first user terminal may display a screen indicating that the participation is rejected. For example, as illustrated in FIG. 13, since another device participates in the secure chat room, the first user terminal may output a message indicating that the device does not participate in the secure chat room.

Figure 13:
FIG. 13 illustrates a chat room participation rejection screen according to an embodiment of the present disclosure.

FIG. 13 illustrates a chat room participation rejection screen according to an embodiment of the present disclosure.

Referring to FIG. 13, according to an embodiment, a screen 1300 may include a secure chat room move menu 1330 or an end menu 1340 together with a chat room title 1310 and a message 1320 indicating that this device does not participate in the chat room. According to an embodiment, in the case where the secure chat room move menu 1330 is selected, a process to move the secure chat room from the first device to the second device among devices of the same user may progress. This process will be described with reference to FIG. 14. According to an embodiment, in the case where the end menu 1340 is selected, the screen 1300 may return to a chat room list screen illustrated in FIG. 12.

Figure 14:
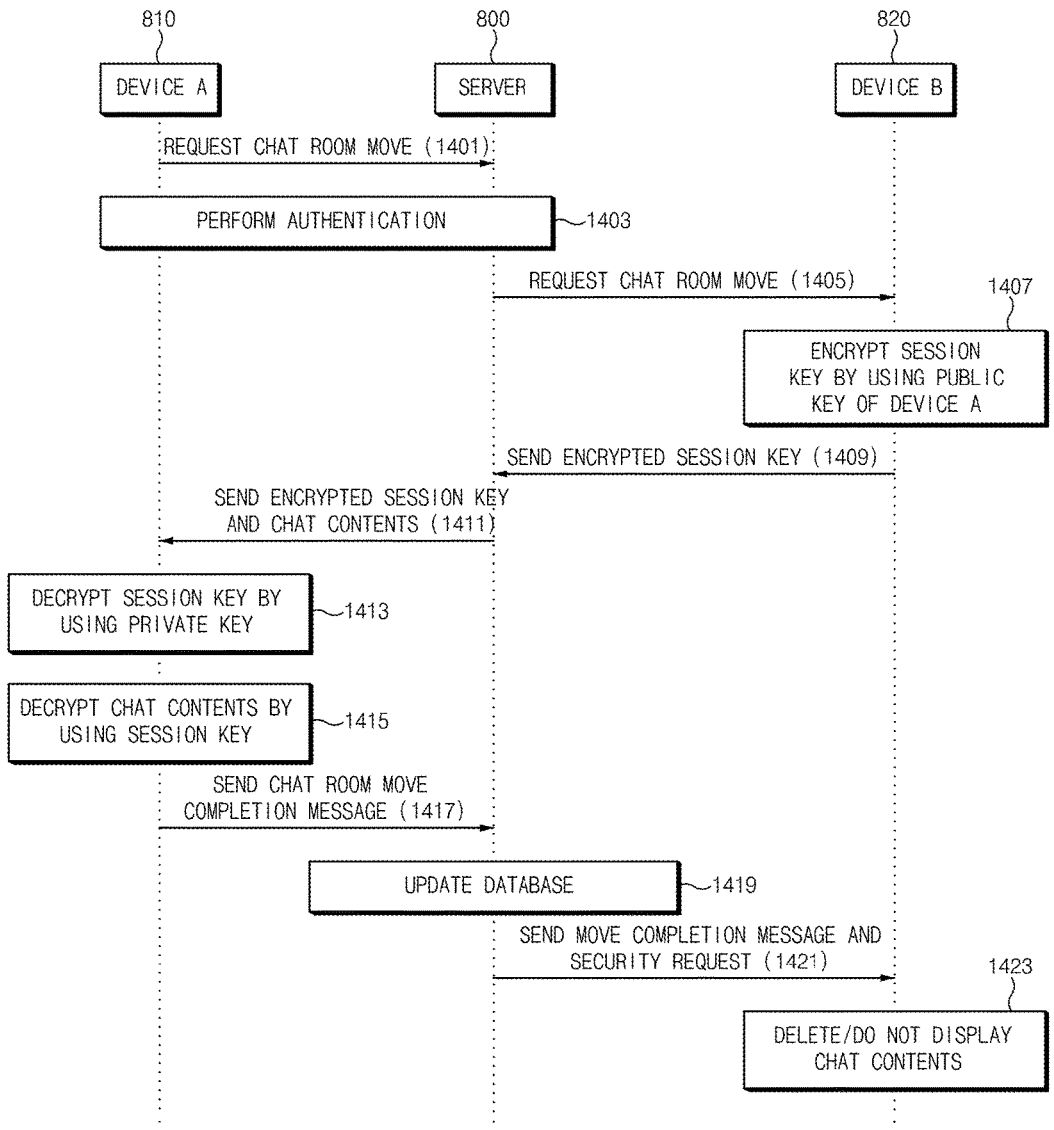
FIG. 14 illustrates a process to move a chat room from a terminal to another terminal, according to an embodiment of the present disclosure.

FIG. 14 illustrates a process to move a chat room from a terminal to another terminal, according to an embodiment of the present disclosure.

Referring to FIG. 14, the device A 810 and the device B 820 may be, for example, a terminal associated with a second user account described in FIG. 8. Moreover, a terminal that currently accepts a chat room invitation (or registered in an acceptance table) from a first user may be the device B 820. The number of terminals of the second user that currently participate in the secure chat room may be plural (in the case where 'n' is not equal to 1). However, the case where 'n' is equal to 1 and where only the device B 820 participates in the secure chat room will be described below. An embodiment where 'n' is not 1 and where a plurality of second user terminals participate in the secure chat room will be described with reference to FIG. 15.

In operation 1401, the device A 810 may send a chat room move request to the server 800. For example, the device A 810 may send a chat room move request to the server 800 in the case where the secure chat room move menu 1330 illustrated in FIG. 13 is selected.

To verify whether the device A 810 that wants to participate in the secure chat room is a right terminal of the second user, in operation 1403, the server 800 may authenticate the device A 810. For example, the server 800 may verify whether the device A 810 is the right terminal of the second user based on information about the second user account and the list of the second user terminal registered in the server 800. After authentication of a device to which the secure chat room is moved is completed, the server 800 may execute the next process. However, according to an embodiment, the authentication process may be omitted or may be previously performed before the process of FIG. 14.

In operation 1405, the server 800 may send a chat room move request to the device B 820 that currently participates in a secure chat room. In the case, the server 800 may provide information (e.g., the public key of the device A 810) about the device A 810 that requests participation in the secure chat room and/or information (e.g., a chat room ID or the like) of the secure chat room to be moved.

In operation 1407, the device B 820 may encrypt a session key of the secure chat room by using the public key of the device A 810. In operation 1409, the device B 820 may send the encrypted session key to the server 800.

In operation 1411, the server 800 may send the encrypted session key received from the device B 820 together with the encrypted chat contents stored in the server 800 to the device A 810. Alternatively, the server 800 may separately send the encrypted session key received from the device B 820 and the encrypted chat contents stored in the server 800 to the device A 810.

In operation 1413, the device A 810 may decrypt the encrypted session key received from the server 800 by using a private key that the device A 810 has. Moreover, in operation 1415, the device A 810 may decrypt the encrypted chat contents by using the session key obtained through decryption. After operation 1415 is completed, the chat contents of the secure chat room may be outputted to a display of the device A 810. However, according to an embodiment, to prevent a plurality of devices from temporarily reading chat contents of the secure chat room, the device A 810 may output the chat contents after a message indicating that operation 1423 is completed is received through the server 800.

In operation 1417, the device A 810 may send a secure chat room move completion message to the server 800 in operation 1421. In operation 1419, the server 800 may update a database (e.g., an acceptance table). According to an embodiment, operation 1419 may be executed after operation 1423. In operation 1421, the server 800 may send the secure chat room move completion message and a security request to the device B 820. The security request may be, for example, a request for delete all chat contents of a secure chat room stored in the device B 820. Moreover, the security request may include a request for deleting a session key. According to an embodiment, the security request may be a request that allows data of chat contents of a secure chat room not to be outputted on a display of the device B 820 while the data is maintained. For example, in the case of an embodiment in which operations 1011, 1019, and 1021 illustrated in FIG. 10 are executed, the security request may correspond to the letter.

In operation 1423, based on contents included in the security request, the device B 820 that receives the secure chat room move completion message and the security request may delete chat content/a session key or may not output the chat contents.

Figure 15:
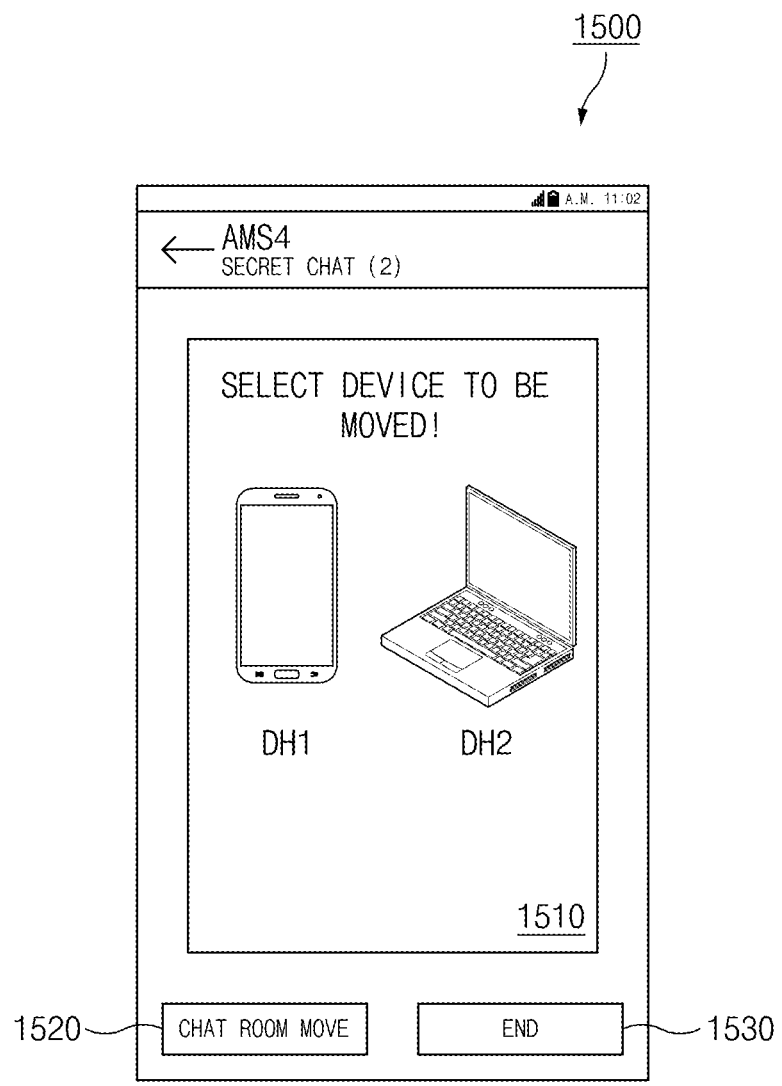
FIG. 15 illustrates a screen for selecting a terminal to which a chat room is moved, according to an embodiment of the present disclosure.

FIG. 15 illustrates a screen for selecting a terminal to which a chat room is moved, according to an embodiment of the present disclosure.

Referring to FIG. 15, according to an embodiment, a secure chat room may be moved as described below. An example described above may be the case where a device that does not participate in a secure chat room performs a move request of the secure chat room. In the case where terminals of the same user account that participate in a secure chat room are plural (e.g., in the case where 'n' is greater than or equal to two), a user may determine whether to move the secure chat room of one among the terminals. For example, referring to FIG. 15, in the case where a new terminal enters a secure chat room AMS4 in a state in which a terminal DH1 and a terminal DH2 already participate in the secure chat room AMS4, a menu (or an image or text) 1510 for selecting whether to move the secure chat room of one among the device DH1 and the DH2 may be provided. For example, if the secure chat room move menu 1520 is selected by a user after the terminal DH1 is selected by the user, the process of FIG. 14 may be executed between the new terminal and the terminal DH1. According to an embodiment, in the case where 'n' is greater than or equal to 3 in an embodiment of FIG. 15, the menu 1510 may not be provided but the new terminal may also participate in the secure chat room based on the process of FIG. 11. According to an embodiment, in the case where the end menu 1530 is selected, the screen 1500 may return to a chat room list screen.

According to an embodiment, in the case where a terminal that provides a screen 1500 is a terminal (e.g., the device B 820) that already participates the secure chat room, the terminal DH1 and the terminal DH2 displayed on the menu 1510 may be terminals, which do not participate in the secure chat room, from among terminals corresponding to the same user account. In this case, the process of FIG. 14 executed between the device B 820 and the terminal DH1 or DH2 may be modified. For example, the device B 820 may execute an operation that is executed by the device A 810 in FIG. 14, and the terminal DH1 or DH2 may execute an operation that is executed by the device B 820 in FIG. 14.

In accordance with an aspect of the present disclosure, an electronic device comprises a processor; a memory in which a messenger application is stored; and a display on which an execution screen of the messenger application is outputted, wherein the processor is configured to display a list of a plurality of chat rooms joined with a first user account on the display, and wherein the list of the plurality of chat rooms comprises a first chat room, in which the electronic device participates, and a second chat room in which another electronic device participates.

According to an embodiment, the processor may display the first chat room and the second chat room in different manners. If the second chat room is selected, the processor may output a message indicating that the electronic device is not capable of participating in the second chat room. If the second chat room is selected, based on a chat room access setting of the messenger application, the processor may output chat contents of the second chat room or to output a message indicating that the electronic device is not capable of participating in the second chat room. According to an embodiment, the chat room access setting comprises a maximum number of devices that are capable of participating in the second chat room, and if a number of devices, which currently participate in the second chat room, is less than the maximum number, the processor may output the chat contents of the second chat room.

According to an embodiment, the electronic device further comprises a communication module, and if a participation request of a chat room created by a second user is received from a server through the communication module, the processor may output an invitation message of the chat room on the display.

In accordance with another aspect of the present disclosure, an electronic device comprises a communication module; a processor; and a memory in which a messenger application associated with account information of a first user is stored, wherein the processor is configured to request a server to create a chat room including the first user and a second user, to encrypt a session key of the chat room by using public keys of a plurality of second user terminals respectively corresponding to account information of the second user, and to allow the communication module to send the session keys encrypted by using the public keys of the plurality of second user terminals to the plurality of second user terminals.

According to an embodiment, the processor allows the communication module to send the encrypted session keys to the server at one time.

According to an embodiment, the communication module may obtain the public keys of the plurality of second user terminals from the server.

According to an embodiment, the processor may send a session key encrypted by using a public key of a second user terminal, which responds to an invitation request, from among the plurality of second user terminals to the second user terminal that responds to the invitation request.

In accordance with another aspect of the present disclosure, a messenger service providing method of a server comprises receiving a creation request of a chat room comprising a first user and a second user from a first user device; sending an invitation request of the chat room to a plurality of second user devices corresponding to the second user; receiving an invitation acceptance message indicating acceptance of the invitation request from at least one device of the plurality of second user devices; and sending a chat message to the at least one device such that the chat message received from the first user device is displayed through only the at least one device.

According to an embodiment, the method further comprises sending a session key of the chat room encrypted by using a public key of the at least one device to the at least one device.

According to an embodiment, the method further comprises sending a fact that an acceptance event of the invitation request is generated, to remaining devices of the plurality of second user devices other than the at least one device.

According to an embodiment, the server obtains session keys respectively encrypted by using public keys of the plurality of second user devices from the first user device, and the sending of the invitation request comprises sending the encrypted session keys to the plurality of second user devices, respectively.

According to an embodiment, the method further comprises receiving a participation request of the chat room from at least another device among the plurality of second user devices; verifying a number of first devices, which is capable of participating in the chat room, among the plurality of second user devices; and comparing the number of first devices with a number of second devices, which currently participate in a secure chat room, from among the plurality of second user devices and sending a participation acceptance or participation rejection message to the at least another device based on the comparison result.

According to an embodiment, the method further comprises receiving a move request of the chat room from at least another device among the plurality of second user devices; and sending, to the at least another device, at least a portion of information of the chat room encrypted by using a secure key of the at least another device.

According to an embodiment, the method further comprises sending a security request to the at least one device if receiving a secure chat room move completion message from the at least another device. In this case, the security request comprises at least one of deleting chat contents of the secure chat room stored in the first terminal, deleting a session key, or prohibiting displaying the chat contents.

According to an embodiment, the method further comprises receiving an updated session key encrypted by using a public key of the at least one device from the first user device; and sending the updated, encrypted session key to the at least one device.

In accordance with another aspect of the present disclosure, an electronic device comprises a display; and a processor operatively connected with the display, wherein the processor is configured to receive an invitation request of a chat room with respect to a user account of the electronic device from an external electronic device, to receive a chat message, which is sent to only the electronic device among a plurality of user terminals corresponding to the user account, from the external electronic device based on occurrence of an acceptance event with respect to the invitation request in the electronic device, to decrypt the chat message by using a private key corresponding to the electronic device, and to display the decrypted chat message through the display.

Figure 16:
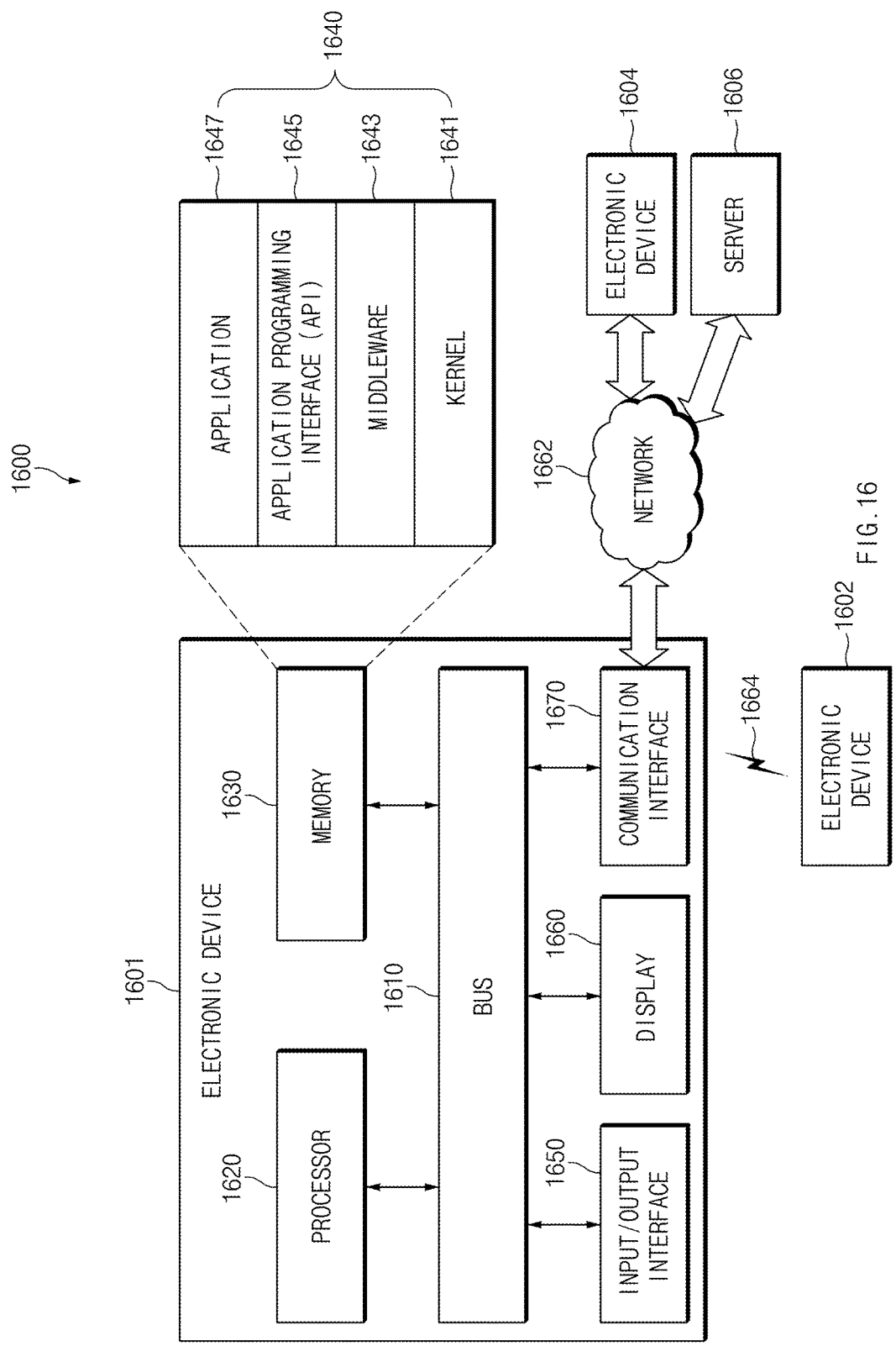
FIG. 16 illustrates a block diagram of an electronic device in a network environment according to an embodiment of the present disclosure.

FIG. 16 illustrates a block diagram of an electronic device in a network environment according to an embodiment of the present disclosure.

Referring to FIG. 16, an electronic device 1601 in a network environment 1600 may include a bus 1610, a processor 1620, a memory 1630, an input/output interface 1650, a display 1660, and a communication interface 1670. In various embodiments of the present disclosure, at least one of the foregoing elements may be omitted or another element may be added to the electronic device 1601.

The bus 1610 may include a circuit for connecting the above-mentioned elements 1610 to 1670 to each other and transferring communications (e.g., control messages and/or data) among the above-mentioned elements.

The processor 1620 may include at least one of a CPU, an AP, or a communication processor (CP). The processor 1620 may perform data processing or an operation related to communication and/or control of at least one of the other elements of the electronic device 1601.

The memory 1630 may include a volatile memory and/or a nonvolatile memory. The memory 1630 may store instructions or data related to at least one of the other elements of the electronic device 1601. According to an embodiment of the present disclosure, the memory 1630 may store software and/or a program 1640. The program 1640 may include, for example, a kernel 1641, a middleware 1643, an application programming interface (API) 1645, and/or an application program (or an application) 1647. At least a portion of the kernel 1641, the middleware 1643, or the API 1645 may be referred to as an operating system (OS).

The kernel 1641 may control or manage system resources (e.g., the bus 1610, the processor 1620, the memory 1630, or the like) used to perform operations or functions of other programs (e.g., the middleware 1643, the API 1645, or the application 1647). Furthermore, the kernel 1641 may provide an interface for allowing the middleware 1643, the API 1645, or the application 1647 to access individual elements of the electronic device 1601 in order to control or manage the system resources.

The middleware 1643 may serve as an intermediary so that the API 1645 or the application 1647 communicates and exchanges data with the kernel 1641.

Furthermore, the middleware 1643 may handle one or more task requests received from the application 1647 according to a priority order. For example, the middleware 1643 may assign at least one application 1647 a priority for using the system resources (e.g., the bus 1610, the processor 1620, the memory 1630, or the like) of the electronic device 1601. For example, the middleware 1643 may handle the one or more task requests according to the priority assigned to the at least one application, thereby performing scheduling or load balancing with respect to the one or more task requests.

The API 1645, which is an interface for allowing the application 1647 to control a function provided by the kernel 1641 or the middleware 1643, may include, for example, at least one interface or function (e.g., instructions) for file control, window control, image processing, character control, or the like.

The input/output interface 1650 may serve to transfer an instruction or data input from a user or another external device to (an)other element(s) of the electronic device 1601. Furthermore, the input/output interface 1650 may output instructions or data received from (an)other element(s) of the electronic device 1601 to the user or another external device.

The display 1660 may include, for example, a liquid crystal display (LCD), a light-emitting diode (LED) display, an organic light-emitting diode (OLED) display, a microelectromechanical systems (MEMS) display, or an electronic paper display. The display 1660 may present various content (e.g., a text, an image, a video, an icon, a symbol, or the like) to the user. The display 1660 may include a touch screen, and may receive a touch, gesture, proximity or hovering input from an electronic pen or a part of a body of the user.

The communication interface 1670 may set communications between the electronic device 1601 and an external device (e.g., a first external electronic device 1602, a second external electronic device 1604, or a server 1606). For example, the communication interface 1670 may be connected to a network 1662 via wireless communications or wired communications so as to communicate with the external device (e.g., the second external electronic device 1604 or the server 1606).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communications 1664. The short-range communications may include at least one of Wi-Fi, Bluetooth (BT), near field communication (NFC), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 1662 may include at least one of telecommunications networks, for example, a computer network (e.g., local area network (LAN) or wide area network (WAN)), the Internet, or a telephone network.

The types of the first external electronic device 1602 and the second external electronic device 1604 may be the same as or different from the type of the electronic device 1601. According to an embodiment of the present disclosure, the server 1606 may include a group of one or more servers. A portion or all of operations performed in the electronic device 1601 may be performed in one or more other electronic devices (e.g., the first external electronic device 1602, the second external electronic device 1604, or the server 1606). When the electronic device 1601 should perform a certain function or service automatically or in response to a request, the electronic device 1601 may request at least a portion of functions related to the function or service from another device (e.g., the first external electronic device 1602, the second external electronic device 1604, or the server 1606) instead of or in addition to performing the function or service for itself. The other electronic device (e.g., the first external electronic device 1602, the second external electronic device 1604, or the server 1606) may perform the requested function or additional function, and may transfer a result of the performance to the electronic device 1601. The electronic device 1601 may use a received result itself or additionally process the received result to provide the requested function or service. To this end, for example, a cloud computing technology, a distributed computing technology, or a client-server computing technology may be used.

Figure 17:
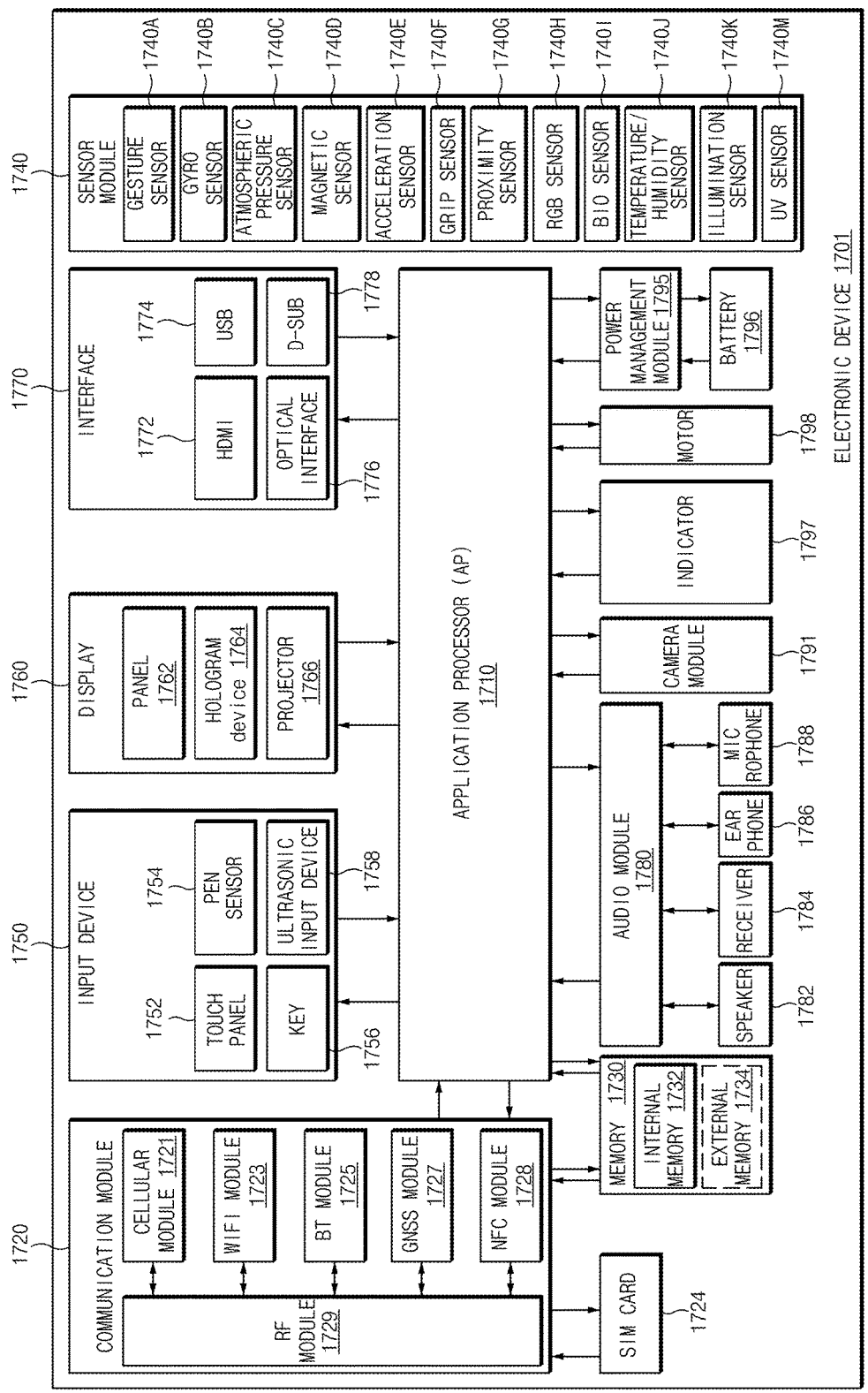
FIG. 17 illustrates a block diagram of an electronic device according to an embodiment of the present disclosure.

FIG. 17 illustrates a block diagram of an electronic device according to an embodiment of the present disclosure.

Referring to FIG. 17, an electronic device 1701 may include, for example, a part or the entirety of the electronic device 1601 illustrated in FIG. 16. The electronic device 1701 may include at least one processor (e.g., AP) 1710, a communication module 1720, a subscriber identification module (SIM) card 1724, a memory 1730, a sensor module 1740, an input device 1750, a display 1760, an interface 1770, an audio module 1780, a camera module 1791, a power management module 1795, a battery 1796, an indicator 1797, and a motor 1798.

The processor 1710 may run an operating system or an application program so as to control a plurality of hardware or software elements connected to the processor 1710, and may process various data and perform operations. The processor 1710 may be implemented with, for example, a system on chip (SoC). According to an embodiment of the present disclosure, the processor 1710 may further include a graphic processing unit (GPU) and/or an image signal processor. The processor 1710 may include at least a portion (e.g., a cellular module 1721) of the elements illustrated in FIG. 17. The processor 1710 may load, on a volatile memory, an instruction or data received from at least one of other elements (e.g., a nonvolatile memory) to process the instruction or data, and may store various data in a nonvolatile memory.

The communication module 1720 may have a configuration that is the same as or similar to that of the communication interface 1670 of FIG. 16. The communication module 1720 may include, for example, the cellular module 1721 (e.g., a modem), a Wi-Fi module 1723, a BT module 1725, a GNSS module 1727 (e.g., a GPS module, a GLONASS module, a BeiDou module, or a Galileo module), an NFC module 1728, and a radio frequency (RF) module 1729.

The cellular module 1721 may provide, for example, a voice call service, a video call service, a text message service, or an Internet service through a communication network. The cellular module 1721 may identify and authenticate the electronic device 1701 in the communication network using the SIM card 1724. The cellular module 1721 may perform at least a part of functions that may be provided by the processor 1710. The cellular module 1721 may include a CP.

Each of the Wi-Fi module 1723, the BT module 1725, the GNSS module 1727 and the NFC module 1728 may include, for example, a processor for processing data transmitted/received through the modules. According to some various embodiments of the present disclosure, at least a part (e.g., two or more) of the cellular module 1721, the Wi-Fi module 1723, the BT module 1725, the GNSS module 1727, and the NFC module 1728 may be included in a single integrated chip (IC) or IC package.

The RF module 1729 may transmit/receive, for example, communication signals (e.g., RF signals). The RF module 1729 may include, for example, a transceiver, a power amp module (PAM), a frequency filter, a low noise amplifier (LNA), an antenna, or the like. According to another embodiment of the present disclosure, at least one of the cellular module 1721, the Wi-Fi module 1723, the BT module 1725, the GNSS module 1727, or the NFC module 1728 may transmit/receive RF signals through a separate RF module.

The SIM card 1724 may include, for example, an embedded SIM and/or a card containing the subscriber identity module, and may include unique identification information (e.g., an integrated circuit card identifier (ICCID)) or subscriber information (e.g., international mobile subscriber identity (IMSI)).

The memory 1730 (e.g., the memory 1630) may include, for example, an internal memory 1732 or an external memory 1734. The internal memory 1732 may include at least one of a volatile memory (e.g., a dynamic random access memory (DRAM), a static RAM (SRAM), a synchronous dynamic RAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 1734 may include a flash drive such as a compact flash (CF), a secure digital (SD), a Micro-SD, a Mini-SD, an extreme digital (xD), a multimedia card (MMC), a memory stick, or the like. The external memory 1734 may be operatively and/or physically connected to the electronic device 1701 through various interfaces.

The sensor module 1740 may, for example, measure physical quantity or detect an operation state of the electronic device 1701 so as to convert measured or detected information into an electrical signal. The sensor module 1740 may include, for example, at least one of a gesture sensor 1740A, a gyro sensor 1740B, a barometric pressure sensor 1740C, a magnetic sensor 1740D, an acceleration sensor 1740E, a grip sensor 1740F, a proximity sensor 1740G, a color sensor 1740H (e.g., a red/green/blue (RGB) sensor), a biometric sensor 1740I, a temperature/humidity sensor 1740J, an illumination sensor 1740K, or an ultraviolet (UV) sensor 1740M. Additionally or alternatively, the sensor module 1740 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 1740 may further include a control circuit for controlling at least one sensor included therein. In some various embodiments of the present disclosure, the electronic device 1701 may further include a processor configured to control the sensor module 1740 as a part of the processor 1710 or separately, so that the sensor module 1740 is controlled while the processor 1710 is in a sleep state.

The input device 1750 may include, for example, a touch panel 1752, a (digital) pen sensor 1754, a key 1756, or an ultrasonic input device 1758. The touch panel 1752 may employ at least one of capacitive, resistive, infrared, and UV sensing methods. The touch panel 1752 may further include a control circuit. The touch panel 1752 may further include a tactile layer so as to provide a haptic feedback to a user.

The (digital) pen sensor 1754 may include, for example, a sheet for recognition which is a part of a touch panel or is separate. The key 1756 may include, for example, a physical button, an optical button, or a keypad. The ultrasonic input device 1758 may sense ultrasonic waves generated by an input tool through a microphone 1788 so as to identify data corresponding to the ultrasonic waves sensed.

The display 1760 (e.g., the display 1660) may include a panel 1762, a hologram device 1764, or a projector 1766. The panel 1762 may have a configuration that is the same as or similar to that of the display 1660 of FIG. 16. The panel 1762 may be, for example, flexible, transparent, or wearable. The panel 1762 and the touch panel 1752 may be integrated into a single module. The hologram device 1764 may display a stereoscopic image in a space using a light interference phenomenon. The projector 1766 may project light onto a screen so as to display an image. The screen may be disposed in the inside or the outside of the electronic device 1701. According to an embodiment of the present disclosure, the display 1760 may further include a control circuit for controlling the panel 1762, the hologram device 1764, or the projector 1766.

The interface 1770 may include, for example, an HDMI 1772, a USB 1774, an optical interface 1776, or a D-subminiature (D-sub) 1778. The interface 1770, for example, may be included in the communication interface 1670 illustrated in FIG. 16. Additionally or alternatively, the interface 1770 may include, for example, a mobile high-definition link (MHL) interface, an SD card/MMC interface, or an IR data association (IrDA) interface.

The audio module 1780 may convert, for example, a sound into an electrical signal or vice versa. At least a portion of elements of the audio module 1780 may be included in the input/output interface 1650 illustrated in FIG. 16. The audio module 1780 may process sound information input or output through a speaker 1782, a receiver 1784, an earphone 1786, or the microphone 1788.

The camera module 1791 is, for example, a device for shooting a still image or a video. According to an embodiment of the present disclosure, the camera module 16091 may include at least one image sensor (e.g., a front sensor or a rear sensor), a lens, an image signal processor (ISP), or a flash (e.g., an LED or a xenon lamp).

The power management module 1795 may manage power of the electronic device 1701. According to an embodiment of the present disclosure, the power management module 1795 may include a power management integrated circuit (PMIC), a charger integrated circuit (IC), or a battery or gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 1796 and a voltage, current or temperature thereof while the battery is charged. The battery 1796 may include, for example, a rechargeable battery and/or a solar battery.

The indicator 1797 may display a specific state of the electronic device 1701 or a part thereof (e.g., the processor 1710), such as a booting state, a message state, a charging state, or the like. The motor 1798 may convert an electrical signal into a mechanical vibration, and may generate a vibration or haptic effect. Although not illustrated, a processing device (e.g., a GPU) for supporting a mobile TV may be included in the electronic device 1701. The processing device for supporting a mobile TV may process media data according to the standards of digital multimedia broadcasting (DMB), digital video broadcasting (DVB), Media-FLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 18:
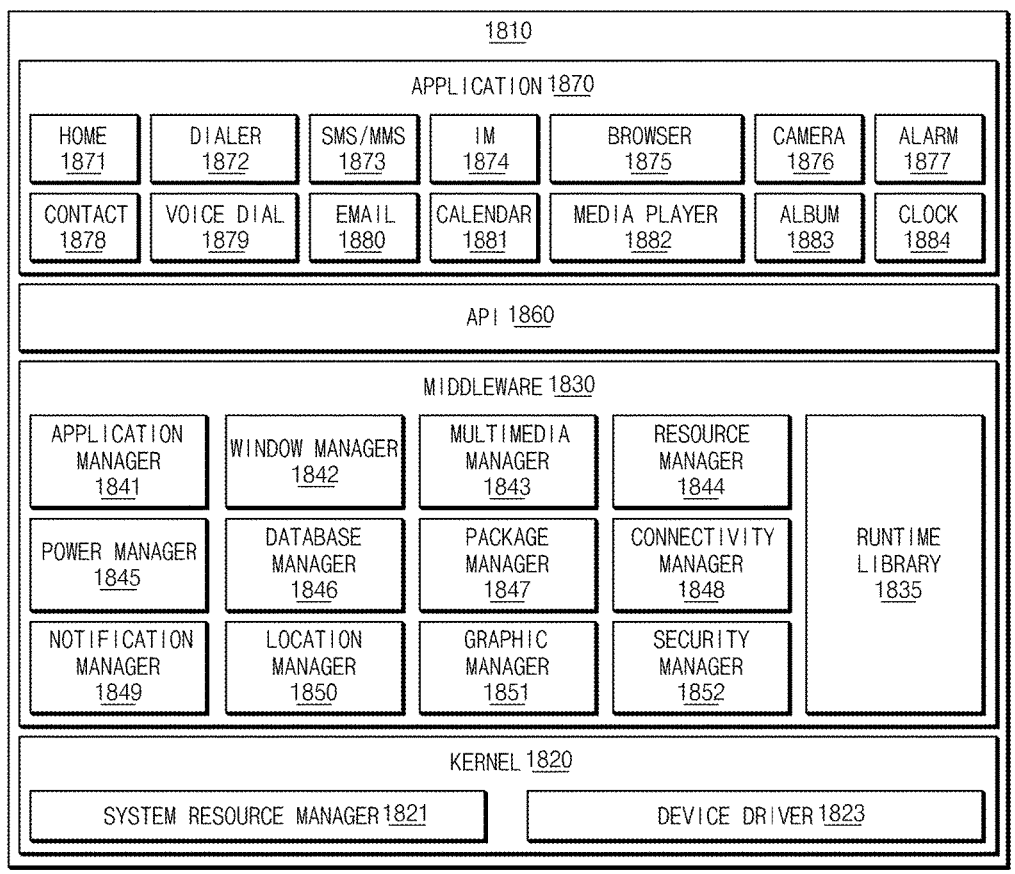
FIG. 18 illustrates a block diagram of a program module according to an embodiment of the present disclosure.

FIG. 18 illustrates a block diagram of a program module according to an embodiment of the present disclosure.

Referring to FIG. 18, a program module 1810 (e.g., the program 1640) may include an OS for controlling a resource related to an electronic device (e.g., the electronic device 1601) and/or various applications (e.g., the application 1647) running on the OS. The operating system may be, for example, Android®, iOS®, Windows®, Symbian®, Tizen®, or the like.

The program module 1810 may include a kernel 1820, a middleware 1830, an API 1860, and/or an application 1870. At least a part of the program module 1810 may be preloaded on an electronic device or may be downloaded from an external electronic device (e.g., the first external electronic device 1602, the second external electronic device 1604, or the server 1606).

The kernel 1820 (e.g., the kernel 1641) may include, for example, a system resource manager 1821 or a device driver 1823. The system resource manager 1821 may perform control, allocation, or retrieval of a system resource. According to an embodiment of the present disclosure, the system resource manager 1821 may include a process management unit, a memory management unit, a file system management unit, or the like. The device driver 1823 may include, for example, a display driver, a camera driver, a BT driver, a shared memory driver, a USB driver, a keypad driver, a Wi-Fi driver, an audio driver, or an inter-process communication (IPC) driver.

The middleware 1830, for example, may provide a function that the applications 1870 require in common, or may provide various functions to the applications 1870 through the API 1860 so that the applications 1870 may efficiently use limited system resources in the electronic device. According to an embodiment of the present disclosure, the middleware 1830 (e.g., the middleware 1643) may include at least one of a runtime library 1835, an application manager 1841, a window manager 1842, a multimedia manager 1843, a resource manager 1844, a power manager 1845, a database manager 1846, a package manager 1847, a connectivity manager 1848, a notification manager 1849, a location manager 1850, a graphic manager 1851, and a security manager 1852.

The runtime library 1835 may include, for example, a library module that a complier uses to add a new function through a programming language while the application 1870 is running. The runtime library 1835 may perform a function for input/output management, memory management, or an arithmetic function.

The application manager 1841 may mange, for example, a life cycle of at least one of the applications 1870. The window manager 1842 may manage a graphic UI (GUI) resource used in a screen. The multimedia manager 1843 may recognize a format required for playing various media files and may encode or decode a media file using a codec matched to the format. The resource manager 1844 may manage a resource such as a source code, a memory, or a storage space of at least one of the applications 1870.

The power manager 1845, for example, may operate together with a basic input/output system (BIOS) to manage a battery or power and may provide power information required for operating the electronic device. The database manager 1846 may generate, search, or modify a database to be used in at least one of the applications 1870. The package manager 1847 may manage installation or update of an application distributed in a package file format.

The connectivity manger 1848 may manage wireless connection of Wi-Fi, BT, or the like. The notification manager 1849 may display or notify an event such as message arrival, appointments, and proximity alerts in such a manner as not to disturb a user. The location manager 1850 may manage location information of the electronic device. The graphic manager 1851 may manage a graphic effect to be provided to a user or a user interface related thereto. The security manager 1852 may provide various security functions required for system security or user authentication. According to an embodiment of the present disclosure, in the case in which an electronic device (e.g., the electronic device 1601) includes a phone function, the middleware 1830 may further include a telephony manager for managing a voice or video call function of the electronic device.

The middleware 1830 may include a middleware module for forming a combination of various functions of the above-mentioned elements. The middleware 1830 may provide a module specialized for each type of an operating system to provide differentiated functions. Furthermore, the middleware 1830 may delete a part of existing elements or may add new elements dynamically.

The API 1860 (e.g., the API 1645) which is, for example, a set of API programming functions may be provided in different configurations according to an operating system. For example, in the case of Android or iOS, one API set may be provided for each platform, and, in the case of Tizen, at least two API sets may be provided for each platform.

The application 1870 (e.g., the application 1647), for example, may include at least one application capable of performing functions such as a home 1871, a dialer 1872, a short message service (SMS)/multi-media message service (MMS) 1873, an instant message (IM) 1874, a browser 1875, a camera 1876, an alarm 1877, a contact 1878, a voice dial 1879, an e-mail 1880, a calendar 1881, a media player 1882, an album 1883, a clock 1884, health care (e.g., measure an exercise amount or blood sugar), or environmental information provision (e.g., provide air pressure, humidity, or temperature information).

According to an embodiment of the present disclosure, the application 1870 may include an information exchange application for supporting information exchange between the electronic device (e.g., the electronic device 1601) and an external electronic device (e.g., the first external electronic device 1602 or the second external electronic device 1604). The information exchange application may include, for example, a notification relay application for relaying specific information to the external electronic device or a device management application for managing the external electronic device.

For example, the notification relay application may have a function for relaying, to an external electronic device (e.g., the first external electronic device 1602 or the second external electronic device 1604), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first external electronic device 1602 or the second external electronic device 1604) communicating with the electronic device, an application running in the external electronic device, or a service (e.g., a call service, a message service, or the like) provided from the external electronic device.

According to an embodiment of the present disclosure, the application 1870 may include a specified application (e.g., a healthcare application of a mobile medical device) according to an attribute of the external electronic device (e.g., the first external electronic device 1602 or the second external electronic device 1604). The application 1870 may include an application received from an external electronic device (e.g., the first external electronic device 1602 or the second external electronic device 1604). The application 1870 may include a preloaded application or a third-party application downloadable from a server. The names of the elements of the program module 1810 illustrated may vary with the type of an operating system.

According to various embodiments of the present disclosure, at least a part of the program module 1810 may be implemented with software, firmware, hardware, or a combination thereof. At least a part of the program module 1810, for example, may be implemented (e.g., executed) by a processor (e.g., the processor 1710). At least a part of the program module 1810 may include, for example, a module, a program, a routine, sets of instructions, or a process for performing at least one function.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a computer-readable storage medium in the form of a program module. In the case where the instructions are performed by a processor (e.g., the processor 1620), the processor may perform functions corresponding to the instructions. The computer-readable storage medium may be, for example, the memory 1630.

A computer-readable recording medium may include a hard disk, a floppy disk, a magnetic medium (e.g., a magnetic tape), an optical medium (e.g., CD-ROM, DVD), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters.

The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

According to various embodiments of the present disclosure, even though a user utilizes a plurality of terminals with one user account, the security of a message may increase by executing a chat service in only one terminal.

Furthermore, user convenience may be improved by adjusting the number of terminals that participates in the chat room or changing a terminal that participates in the chat room, by settings of the user.

Besides, a variety of effects directly or indirectly understood through the present disclosure may be provided.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a processor;
a memory configured to store a messenger application, wherein the electronic device is part of a group of two or more electronic user devices registered to a user account and the message application is installed on each of the two or more user devices as well as one or more electronic devices registered to a second user account; and
a display,
wherein the processor is configured to:
 execute the messenger application, and
 display a list of a plurality of chat rooms, wherein each of the chat rooms listed is a chat room that one of the user devices from the group of two or more user devices has joined, the list of the plurality of chat rooms including a first chat room, which is a normal chat room, and a second chat room which is a secure chat room that the electronic device has not joined,
 receive an invitation from one of the one or more electronic devices registered to the second user account to join the second chat room,
 obtain, from a server, information on a maximum number of devices from the user account that are allowed to participate in the second chat room, and
 in response to receiving the invitation and receiving acceptance to join the second chat room:
  when no other devices from the group of user devices registered to the user account have accepted an invitation to join the second chat room, display chat contents of the second chat room after the electronic device accepts the invitation,
  when another electronic device from the group of user devices registered to the user account has accepted the invitation to join the second chat room but the number of electronic devices from the group of user devices currently participating in the second chat room is less than the maximum number, allow the electronic device to join the second chat room and display the chat contents of the second chat room to the electronic device,
  when the other electronic device from the group of user devices registered to the user account has accepted the invitation to join the second chat room and the number of electronic devices from the group of user devices currently participating in the second chat room is equal to or exceeds the maximum number of devices allowed to participate, display a user interface indicating that the electronic device is not allowed to enter the second chat room; and
  disable access of the electronic device to the second chat room, after having received acceptance from the electronic device to join the second chat room and allowed the electronic device to join the second chat room, when a cancellation of the acceptance is received from the other electronic device from the group of user devices registered to the user account that is not currently participating in the second chat room.

2. The electronic device of claim 1, wherein the processor is further configured to display the first chat room and the second chat room in the list in different manners.

3. The electronic device of claim 1, further comprising:
a transceiver,
wherein, when a participation request of a third chat room created by a second user is received from a server through the transceiver, the processor is further configured to output an invitation message of the third chat room on the display.

4. A non-transitory computer-readable storage medium storing computer executable instructions for providing a messenger service, wherein an electronic device is part of a group of two or more electronic user devices registered to a user account and a message application is installed on each of the two or more user devices as well as one or more electronic devices registered to a second user account, the instructions executable by a processor of the electronic device to cause the processor to at least:
 execute the messenger application,
 display a list of a plurality of chat rooms, wherein each of the chat rooms listed is a chat room that one of the user devices from the group of two or more user devices has joined, the list of the plurality of chat rooms including a first chat room, which is a normal chat room, and a second chat room, which is a secure chat room, that the electronic device has not joined,
 receive an invitation from one of the one or more electronic devices registered to the second user account to join the second chat room,
 obtain, from a server, information on a maximum number of devices from the user account that are allowed to participate in the second chat room, and
 in response to receiving the invitation and receiving acceptance to join the second chat room:

when no other devices from the group of user devices registered to the user account have accepted an invitation to join the second chat room, display chat contents of the second chat room after the electronic device accepts the invitation, when another electronic device from the group of user devices registered to the user account has accepted an invitation to join the second chat room but the number of electronic devices from the group of user devices currently participating in the second chat room is less than the maximum number, allow the electronic device to join the second chat room and display the chat contents of the second chat room to the electronic device, when the other electronic device from the group of user devices registered to the user account has accepted the invitation to join the second chat room and the number of electronic devices from the group of user devices currently participating in the second chat room is equal to or exceeds the maximum number of devices allowed to participate, display a user interface indicating that the electronic device is not allowed to enter the second chat room; and disable access of the electronic device to the second chat room, after having received acceptance from the electronic device to join the second chat room and allowed the electronic device to join the second chat room, when a cancellation of the acceptance is received from the other electronic device from the group of user devices registered to the user account that is not currently participating in the second chat room.

5. The non-transitory computer-readable storage medium of claim 4, wherein the instructions further cause the processor to display the first chat room and the second chat room in the list in different manners.

* * * * *